(12) United States Patent
Anazawa et al.

(10) Patent No.: US 11,644,680 B2
(45) Date of Patent: May 9, 2023

(54) DICHROIC MIRROR ARRAY AND LIGHT DETECTING DEVICE

(71) Applicant: HITACHI HIGH-TECH CORPORATION, Tokyo (JP)

(72) Inventors: Takashi Anazawa, Tokyo (JP); Ryoji Inaba, Tokyo (JP); Shuhei Yamamoto, Tokyo (JP); Taro Nakazawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 17/282,396

(22) PCT Filed: Oct. 12, 2018

(86) PCT No.: PCT/JP2018/038131
§ 371 (c)(1),
(2) Date: Apr. 2, 2021

(87) PCT Pub. No.: WO2020/075293
PCT Pub. Date: Apr. 16, 2020

(65) Prior Publication Data
US 2021/0389600 A1   Dec. 16, 2021

(51) Int. Cl.
*G02B 27/14* (2006.01)
*G01N 21/64* (2006.01)

(52) U.S. Cl.
CPC ....... *G02B 27/141* (2013.01); *G01N 21/6402* (2013.01); *G01N 21/6486* (2013.01);
(Continued)

(58) Field of Classification Search
None
See application file for complete search history.

(56) References Cited

U.S. PATENT DOCUMENTS 6,603,537 B1    8/2003   Dietz et al.
2009/0274176 A1 * 11/2009  O'Shaughnessy .... H01S 3/2383
                                              372/99
(Continued)

FOREIGN PATENT DOCUMENTS

GB    2562428 A    11/2018
JP    53-107383 A   9/1978
(Continued)

OTHER PUBLICATIONS

Japanese Office Action dated Oct. 25, 2022 for Japanese Patent Application No. 2020-549924.

*Primary Examiner* — Toan Ton
*Assistant Examiner* — Danell L Owens
(74) *Attorney, Agent, or Firm* — Volpe Koenig

(57) ABSTRACT

In a right-handed XYZ coordinate system, a dichroic-mirror array of the present disclosure includes a first group in which m (m≥2) dichroic mirrors DA1 to DAm are arranged parallel to each other along a positive direction of an X axis and a second group in which n (n≥2) dichroic mirrors DB1 to DBn are arranged parallel to each other along a negative direction of the X axis. Incident surfaces of the DA1 to DAm and incident surfaces of the DB1 to DBn are perpendicular to an XZ plane. A slope of straight lines with normal lines of the incident surfaces of the DA1 to DAm projected onto the XZ plane are negative, and a slope of straight lines with normal lines of incident surfaces of DB1 to DBn projected onto the XZ plane are positive.

21 Claims, 23 Drawing Sheets

(52) U.S. Cl.
CPC ............... *G01N 2021/6439* (2013.01); *G01N 2021/6463* (2013.01)

(56) References Cited

U.S. PATENT DOCUMENTS

| | | |
|---|---|---|
| 2012/0001083 A1 | 1/2012 | Knapp |
| 2013/0193345 A1 | 8/2013 | Nishiwaki |
| 2019/0064535 A1 | 2/2019 | Anazawa et al. |

FOREIGN PATENT DOCUMENTS

| | | | |
|---|---|---|---|
| JP | 2002-523731 A | | 7/2002 |
| JP | 2010217652 A | * | 9/2010 |
| JP | 2012-242117 A | | 12/2012 |
| JP | 2013-156455 A | | 8/2013 |
| JP | 2013-532293 A | | 8/2013 |
| WO | 2017/145230 A1 | | 8/2017 |
| WO | 2017/145231 A1 | | 8/2017 |

* cited by examiner

FIG. 2A
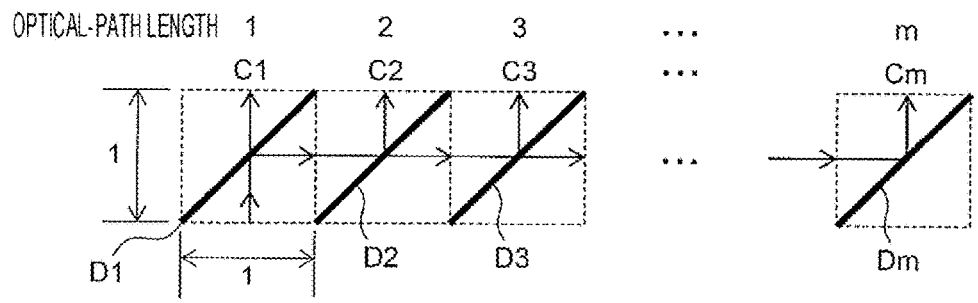
FIG. 2B
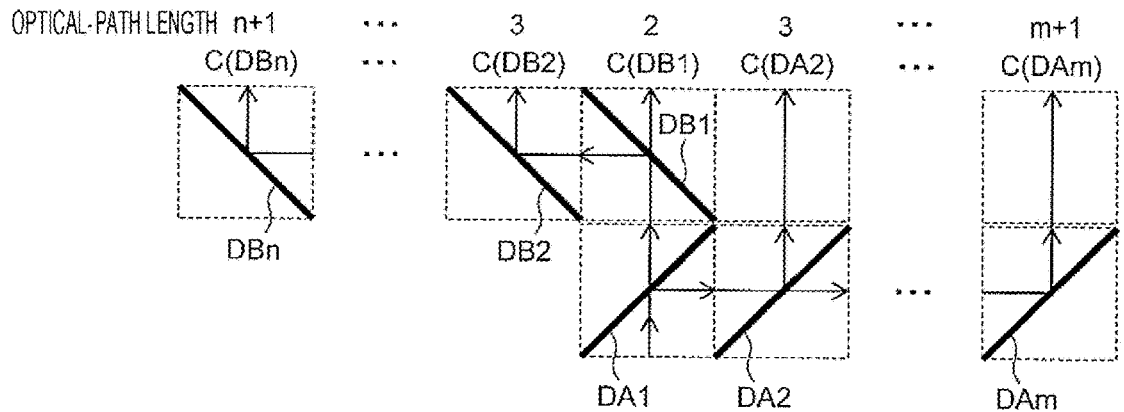
FIG. 3
| NUMBER OF SPLITS | 3 | 4 | 5 | 6 | 7 | 8 | 9 | 10 | 11 | 12 | 13 |
|---|---|---|---|---|---|---|---|---|---|---|---|
| | MAXIMUM OPTICAL-PATH LENGTH ||||||||||||
| CONVENTIONAL EXAMPLE | 3 | 4 | 5 | 6 | 7 | 8 | 9 | 10 | 11 | 12 | 13 |
| PRESENT EMBODIMENT | 3 | 4 | 4 | 5 | 5 | 6 | 6 | 7 | 7 | 8 | 8 |
| | OPTICAL-PATH-LENGTH DIFFERENCE (MAXIMUM OPTICAL-PATH LENGTH − MINIMUM OPTICAL-PATH LENGTH) ||||||||||||
| CONVENTIONAL EXAMPLE | 2 | 3 | 4 | 5 | 6 | 7 | 8 | 9 | 10 | 11 | 12 |
| PRESENT EMBODIMENT | 1 | 2 | 2 | 3 | 3 | 4 | 4 | 5 | 5 | 6 | 6 |

DICHROIC MIRROR ARRAY AND LIGHT DETECTING DEVICE

TECHNICAL FIELD

The present disclosure relates to a dichroic-mirror array and a photodetector.

BACKGROUND ART

A dichroic-mirror array is an array of a plurality of dichroic mirrors having different spectral characteristics (wavelength dependence of transmitted light and reflected light with respect to incident light) and arranged at substantially equal intervals in parallel with each other along the same direction. The dichroic-mirror array is mounted on a photodetector in such as a capillary-array DNA sequencer or an automatic biochemical analyzer that detects and analyzes lights emitted from samples.

A light flux incident on the dichroic mirror array is split into a plurality of light fluxes (split lights) having different wavelength bands by repeating reflection and transmission by each dichroic mirror in the order of arrangement of the dichroic mirrors. The split lights produced by the dichroic-mirror array is detected (detected in multiple colors) by, for example, a CCD sensor. Alternatively, a plurality of light fluxes having different wavelength bands respectively incident on each dichroic mirror are integrated into a single light flux in which different wavelength bands are superposed by repeating reflection and transmission by each dichroic mirror.

As a photodetector using a dichroic mirror array, PTL 1 discloses, "A spectroscopic device for detecting light of each wavelength band by dividing an incident light into lights having wavelength bands different from each other, comprising: a spectroscopic unit in which a plurality of spectroscopic elements having wavelength band characteristics different from each other are arranged; a wavelength selection unit that includes a plurality of wavelength selection elements provided to face the spectroscopic elements respectively; a light detection unit that includes a photoelectric multiplying tube which includes a photoelectric surface for photoelectrically converting a transmitted light from the plurality of wavelength selection elements, a plurality of electron multiplying paths provided corresponding to each of the plurality of wavelength selection elements, and a plurality of anodes provided corresponding to each of the electron multiplying paths; and a holding unit that holds the wavelength selection unit in a housing, wherein the holding unit includes a main body in which the wavelength selection elements are arranged in one direction and a pair of wall portions that protrudes from the main body to be opposite to each other, and wherein the spectroscopic elements are arranged between the pair of wall portions along an arrangement direction of the wavelength selection elements" (see claim 1).

In general, when the distance between a plurality of light-emission points is fixed, the shorter the focal length of the condensing lens, the higher the detection sensitivity is possible. On the other hand, the shorter the maximum optical-path length, the more independent detection (low crosstalk detection) is possible. This is because when the maximum optical-path length is increased, the maximum size of the split-light spots projected on the sensor is increased, and the spots derived from the adjacent light-emission points are mixed with each other to generate crosstalk. That is, by downsizing the photodetector including the dichroic-mirror array, it is possible to perform multicolor detection of a plurality of incident lights with high sensitivity and independently.

In PTL 2, as a photodetector that realizes miniaturization, high sensitivity, and low crosstalk, there is disclosed "A light-emission detection apparatus comprising: a condensing-lens array in which M condensing lenses are arranged, for individually condensing lights emitted from a emission-point array in which M emission points are arranged, to form M light beams, where $M \geq 2$; at least one sensor on which the M light beams are not re-condensed but incident in parallel, wherein when an average of effective diameters of the M emission points is d, an average of focal lengths of the M condensing lenses is f, an average of intervals of the M condensing lenses is p, and an average of maximum optical path lengths between the M condensing lenses and the sensor is g, the d, f, p, and g satisfy a certain relation that is predetermined so as to be capable of detecting the M pieces of light emission with low crosstalk or high sensitivity" (see claim 1).

However, as the dichroic-mirror array is miniaturized, the influence of the thickness of each dichroic mirror cannot be ignored, and the aperture width, which is the upper limit width of the incident-light flux that can be split into a plurality of split lights by the dichroic-mirror array, is reduced.

In PTL 3, in order to reduce the size of each dichroic mirror to reduce the maximum optical-path length and at the same time to increase the aperture width, there is disclosed "A dichroic mirror array in which a plurality of dichroic mirrors of numbers 1, 2, . . . , N are arranged in a numerical order in a first direction with $N \geq 2$, wherein a normal vector on a front surface of the plurality of dichroic mirrors is configured by a sum of a positive component in the first direction and a negative component in a second direction perpendicular to the first direction, wherein the plurality of normal vectors are substantially parallel to each other, and wherein, with $0 \leq \theta_0 \leq 90°$, when an average of angles which are formed by the plurality of normal vectors and a direction opposite to the second direction is referred to as $\theta_0$, an average of refractive indices of substrates of the dichroic mirrors is referred to as $n_0$, an average of widths of the substrates of the dichroic mirrors is referred to as $\alpha$, an average of thicknesses of the substrates of the dichroic mirrors is referred to as $\beta$, and an average of intervals between the dichroic mirrors is referred to as x, and with $2 \leq n \leq N$, when an average of distances by which an end of the nth dichroic mirror in the second direction is shifted in the direction opposite to the second direction with respect to an end of the (n−1)th dichroic mirror in the second direction is referred to as yz, $\theta_0$, $n_0$, $\alpha$, $\beta$, x, and yz satisfy a predetermined relationship so as to increase an opening width of the dichroic mirror array or reduce an optical path length thereof" (see claim 1).

CITATION LIST

Patent Literature

PTL 1: JP 2012-242117 A
PTL 2: WO 2017/145230
PTL 3: WO 2017/145231

SUMMARY OF INVENTION

Technical Problem

In general, in order to detect and measure accurately lights having CN1 colors to be respectively analyzed, the photodetector necessarily detects CN2 (CN2≥CN1) colors. Further, when detecting lights having CN1 colors, the larger difference between CN2−CN1, the higher detection accuracy of the photodetector. Therefore, in order to maintain and improve the analysis accuracy, it is necessary to increase the number of colors CN2 that can be detected by the photodetector.

As described above, in the photodetector using the dichroic-mirror array, the maximum optical-path length is reduced and the photodetector is miniaturized, whereby independent and highly accurate multicolor detection of incident light is possible. However, increasing the number of dichroic mirrors and the number of splits of the incident light increases the maximum optical-path length, which makes it difficult to detect the incident light independently and with high accuracy.

PTL 2 realizes four-color detection of four-incident lights by using a dichroic-mirror array composed of four types of dichroic mirrors. On the other hand, for example, if eight colors of four-incident lights are detected under the same conditions except that eight types of dichroic mirrors are used, the maximum size of the spots of the split lights projected on the sensor is nearly 2 times as compared to the case of four-color detection. Further, spots derived from different incident lights are mixed with each other to generate crosstalk. In addition, spots derived from different split lights of one incident light are also mixed with each other, making it impossible to detect eight colors of each incident light with high accuracy.

When the number of dichroic mirrors that form the dichroic-mirror array is increased so as to increase the number of splits of the incident light, the difference between the minimum optical distance (minimum optical-path length) and the maximum optical-path length between the condensing lens and the sensor is expanded. As a result, the difference between the size of the spot formed by the minimum optical-path length and the size of the spot formed by the maximum optical-path length is expanded, so that the difference in the intensity densities of the spots having the same total intensity increases, and overall sensitivity and dynamic range of the photodetector itself is lowered.

Therefore, an object of the present disclosure is to provide a dichroic-mirror array that enables highly sensitive, highly accurate, and independent multicolor detection of incident lights, and a photodetector using the dichroic mirror array.

Solution to Problem

A dichroic-mirror array of this disclosure includes a first group of m (m≥2) dichroic mirrors DA1 to DAm which are arranged in numerical order and parallel to each other along a positive direction of an X axis and a second group of n (n≥2) dichroic mirrors DB1 to DBn which are arranged in numerical order and parallel to each other along a negative direction of the X axis, in a right-handed XYZ coordinate system. X coordinates of the DA2 to DAm are positive. X coordinates of the DB2 to DBn are negative. Incident surfaces of the DA1 to DAm and incident surfaces of the DB1 to DBn are perpendicular to an XZ plane. Slopes of straight lines obtained by projecting normal lines of the incident surfaces of the DA1 to DAm onto the XZ plane are negative. Slopes of straight lines obtained by projecting normal lines of the incident surfaces of the DB1 to DBn onto the XZ plane are positive.

Other features of the disclosure will be clear from the description and the accompanying drawings of this specification. In addition, embodiments of the disclosure are achieved and realized by elements, combinations of various elements, the following detailed description, and the attached claims.

It is necessary to understand that the description of this specification is given only as a typical example, and does not limit the scope of claims or applications of the disclosure.

Advantageous Effects of Invention

According to the present disclosure, it is possible to provide a dichroic-mirror array that enables highly sensitive, highly accurate, and independent multicolor detection of incident lights, and an analyzer using the dichroic-mirror array.

Objects, configurations, and effects besides the above description will be apparent through the explanation on the following embodiments.

BRIEF DESCRIPTION OF DRAWINGS

FIGS. 2A and 2B are a diagram illustrating optical-path lengths required for reflected lights or transmitted lights generated by individual dichroic mirrors.

FIG. 3 is a diagram illustrating results of comparing optical-path lengths of dichroic-mirror arrays having 3 to 13 split ability.

DESCRIPTION OF EMBODIMENTS

Hereinafter, embodiments of the present disclosure will be described using a right-handed XYZ coordinate system.

1. First Embodiment

Figure 1:
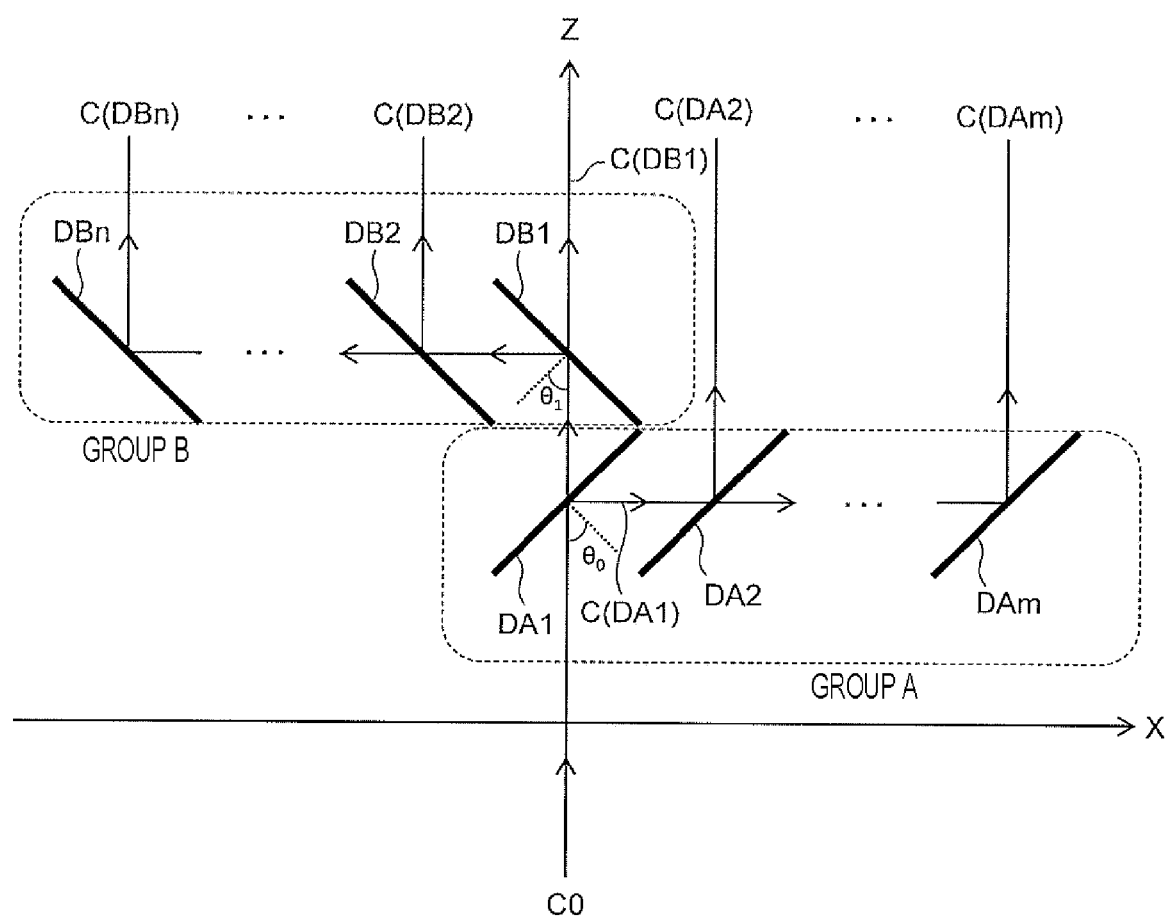
FIG. 1 is a cross-sectional view illustrating a configuration of a dichroic-mirror array according to a first embodiment.

FIG. 1 is a cross-sectional view illustrating a configuration of a dichroic-mirror array according to a first embodiment. As illustrated in FIG. 1, the dichroic-mirror array according to this embodiment includes a group A (first group) composed of m (m is an integer of 2 or more) dichroic mirrors DA1, DA2, . . . , DAm and a group B (second group) composed of n (n is an integer of 2 or more) dichroic mirrors DB1, DB2, . . . , DBn.

Generally, a dichroic mirror has an incident surface (that is, a reflecting surface) and an exit surface, and these surfaces are parallel to each other (these normal lines are also parallel to each other). Therefore, in this specification, a slope (direction) in which the dichroic mirror is arranged is expressed in common for the incident surface and the exit surface. That is, it is also possible to replace the incident surface described in this specification with the exit surface.

The dichroic mirror DA1 is arranged on the Z axis. The dichroic mirrors DA1 to DAm are arranged so that the incident surfaces thereof are perpendicular to the XZ plane and parallel to each other along the positive direction of the X axis. The straight lines with the normal lines of the incident surfaces of the dichroic mirrors DA1 to DAm projected onto the XZ plane have a negative slope on the XZ plane. The angle between the normal lines of the incident surfaces of the dichroic mirrors DA1 to DAm and the Z axis is set to $\theta_0$. In the example illustrated in FIG. 1, $\theta_0$ is 45°, and the normal line of the incident surface of any of the dichroic mirrors DA1 to DAm is parallel to the straight line Z=−X. In other words, the incident surfaces of the dichroic mirrors DA1 to DAm are parallel to the straight line Z=X.

The dichroic mirror DB1 is arranged on the Z axis. The dichroic mirrors DB1 to DBn are arranged so that the incident surfaces thereof are perpendicular to the XZ plane and parallel to each other along the negative direction of the X axis. The straight lines with the normal lines of the incident surfaces of the dichroic mirrors DB1 to DBn projected onto the XZ plane have a positive slope on the XZ plane. The angle between the normal lines of the incident surfaces of the dichroic mirrors DB1 to DBn and the Z axis is set to $\theta_1$. In the example illustrated in FIG. 1, $\theta_1$ is 45°, and the normal line of the incident surface of any of the dichroic mirrors DB1 to DBn is parallel to the straight line Z=X. In other words, the incident surfaces of the dichroic mirrors DB1 to DBn are parallel to the straight line Z=−X.

As described above, the normal line of the incident surfaces of any of the dichroic mirrors DA1 to DAm of the group A and the normal line of the incident surfaces of any of the dichroic mirrors DB1 to DBn of the group B are both parallel to the XZ plane, but their directions are different from each other. In the example illustrated in FIG. 1, the dichroic mirrors DA1 to DAm of the group A and the dichroic mirrors DB1 to DBn of the group B are arranged such that the normal lines of the incident surfaces of the both groups are orthogonal to each other. Note that $\theta_0$ and $\theta_1$ are not limited to 45°, respectively, and can be arbitrarily set within a range in which the incident light can be separated.

As illustrated in FIG. 1, in the dichroic-mirror array according to this embodiment, the group B is arranged on the positive direction side of the Z axis with respect to the group A. Thus, the dichroic-mirror array has a two-layer structure as a whole. Further, the dichroic mirrors DA2 and DB2 have different positions in the X-axis direction, the dichroic mirrors DA2 to DAm have positive X coordinates, and the dichroic mirrors DB2 to DBn have negative X coordinates. As a result, the split lights C(DA2) to C(DAm) and C(DB1) to C(DBn) can be obtained from one incident light C0 by the dichroic mirrors DA2 to DAm and the dichroic mirrors DB1 to DBn.

Each dichroic mirror has an optical film formed on at least one surface of a transparent substrate having a refractive index of no. As the transparent substrate, for example, quartz glass is used. In the present disclosure, some of the dichroic mirrors constituting the dichroic-mirror array may be a total reflection mirror or a half mirror having low wavelength dependence. Therefore, in the present disclosure, a dichroic mirror, a total reflection mirror, and a half mirror may be referred to as a dichroic mirror without distinction.

The incident light C0 is incident on the dichroic mirror DA1 at an incident angle $\theta_0$ from the negative direction of the Z axis to the positive direction. The incident light C0 is split by the dichroic mirror DA1 into a reflected light C(DA1) traveling in the positive direction of the X axis and a transmitted light traveling in the positive direction of the Z axis. The reflected light by the dichroic mirror DA1 is incident on the dichroic mirror DA2 and is split into a transmitted light traveling in the positive direction of the X axis and a reflected light C(DA2) traveling in the positive direction of the Z axis. In the same manner, the reflected light C(DA1) by the dichroic mirror DA1 generates (m−1) split lights (the reflected lights C(DA2) to C(DAm)) traveling in the positive direction of the Z axis by the dichroic mirrors DA2 to DAm.

Of the dichroic mirrors DA1 to DAm, any dichroic mirror is set as a dichroic mirror DAj (2≤j≤(m−1)). A transmitted light through the dichroic mirror DAj is incident on DA(j+1) and is split into a transmitted light traveling in the positive direction of the X axis and a reflected light C(DA(j+1)) traveling in the positive direction of the Z axis.

On the other hand, the transmitted light through the dichroic mirror DA1 is incident on the dichroic mirror DB1 and is split into the reflected light traveling in the negative direction of the X axis and the transmitted light C(DB1) traveling in the positive direction of the Z axis. The reflected light by the dichroic mirror DB1 is incident on the dichroic mirror DB2 and is split into a transmitted light traveling in the negative direction of the X axis and a reflected light C(DB2) traveling in the positive direction of the Z axis. Similarly, the transmitted light through the dichroic mirror DA1 generates n split lights C(DB1) to C(DBn) traveling in the positive direction of the Z axis by the dichroic mirrors DB1 to DBn.

Of the dichroic mirrors DB1 to DBn, any dichroic mirror is set as a dichroic mirror DBk (2≤k≤(n−1)). A transmitted light through the dichroic mirror DBk is incident on DB(k+1) and is split into a transmitted light traveling in the negative direction of the X axis and a reflected light C(DB(k+1)) traveling in the positive direction of the Z axis.

From the above, the total number of split lights obtained by the dichroic-mirror array according to this embodiment is (m+n−1). Since each split light has a different wavelength component contained in the incident light C0, it is possible to perform multicolor detection or spectroscopic analysis of the incident light C0 by detecting each split light.

The split lights C(DAj) and C(DBk) are set as the split light C(X). When the central wavelength of each split light C(X) is represented by λ(C(X)), the configuration of the dichroic-mirror array is simplified by satisfying any of the following Expressions (1) to (8).

$$\lambda(C(DA2)) < \ldots < \lambda(C(DAm)) < \lambda(C(DB1)) < \ldots < \lambda(C(DBn)) \quad (1)$$

$$\lambda(C(DAm)) < \ldots < \lambda(C(DA2)) < \lambda(C(DB1)) < \ldots < \lambda(C(DBn)) \quad (2)$$

$$\lambda(C(DA2)) < \ldots < \lambda(C(DAm)) < \lambda(C(DBn)) < \ldots < \lambda(C(DB1)) \quad (3)$$

$$\lambda(C(DAm)) < \ldots < \lambda(C(DA2)) < \lambda(C(DBn)) < \ldots < \lambda(C(DB1)) \quad (4)$$

$$\lambda(C(DB1)) < \ldots < \lambda(C(DBn)) < \lambda(C(DA2)) < \ldots < \lambda(C(DAm)) \quad (5)$$

$$\lambda(C(DBn)) < \ldots < \lambda(C(DB1)) < \lambda(C(DA2)) < \ldots < \lambda(C(DAm)) \quad (6)$$

$$\lambda(C(DB2)) < \ldots < \lambda(C(DBn)) < \lambda(C(DAm)) < \ldots < \lambda(C(DA2)) \quad (7)$$

$$\lambda(C(DBn)) < \ldots < \lambda(C(DB2)) < \lambda(C(DAm)) < \ldots < \lambda(C(DA2)) \quad (8)$$

That is, it is preferable that the group A generates split lights with short wavelength bands and the group B generates split lights with long wavelength bands, or the group B generates split lights with short wavelength bands and the group A generates split lights with long wavelength bands. In particular, it is easy for the dichroic mirror DA1 to split the incident light into short wavelength band and long wavelength band and direct them to the groups A and B, respectively.

FIG. 2 is a diagram illustrating the optical path lengths required for reflected lights or transmitted lights generated by individual dichroic mirrors. Each dichroic mirror is separated by a unit as illustrated by the dotted square in FIG. 2. The upper end, right end, lower end, and left end of the unit are the uppermost end, the rightmost end, the lowermost end, and the leftmost end of each dichroic mirror, respectively. For each split light, the optical path length from the position where the incident light is incident on the DA1 unit to the position where the split light is exited from each dichroic mirror is obtained. Since the optical-path lengths in the region not included in the units is often common to the conventional dichroic-mirror array and the dichroic-mirror array according to this embodiment, they are ignored here.

Here, in order to simplify the evaluation of the optical-path lengths, the optical path length per unit is set to 1. Looking at each unit, the transmitted light and reflected light by each dichroic mirror have the same optical path length.

FIG. 2A illustrates the optical-path lengths required for reflected lights or transmitted lights generated by individual dichroic mirrors in a conventional dichroic-mirror array. As illustrated in FIG. 2A, the conventional dichroic-mirror array has a configuration in which m dichroic mirrors Dl to Dm are arranged on a straight line in parallel with each other, and split lights C1 to Cm can be obtained. As illustrated in FIG. 2A, the split light C1 has an optical path length of 1 for one unit, the split light C2 has an optical path length of 2 for two units, and similarly, the split light Cm has an optical path length of m for m units. That is, the maximum optical-path length in the conventional dichroic-mirror array is m.

FIG. 2B illustrates the optical-path lengths required for reflected lights or transmitted lights generated by individual dichroic mirrors in the dichroic-mirror array according to this embodiment. In FIG. 2B, unlike the case in FIG. 2A, units are also denoted in a portion (the upper portion of DA2 to DAm) where any dichroic mirror does not exist but the split lights travel. The above portion is caused by the two-layer structure of the dichroic-mirror. This structure is for arranging the sensor that detects the split lights parallel to the arrangement direction of the dichroic mirrors. As illustrated in FIG. 2B, the maximum optical-path length of the dichroic mirror-array according to this embodiment is the larger of (m+1) and (n+1). On the other hand, as illustrated in FIG. 2A, in order to obtain (m+n−1) split lights by using the conventional dichroic-mirror array, the maximum optical-path length is (m+n−1).

Therefore, the dichroic-mirror array according to this embodiment can reduce a maximum optical-path length by the larger of (m+1)/(m+n−1) and (n+1)/(m+n−1) times compared to the conventional dichroic-mirror array. Therefore, when m≈n, the maximum optical-path length can be reduced to about half. For example, when m=n=10, the maximum optical-path length can be reduced by 0.58 times.

On the other hand, the minimum optical-path length is 2 in the dichroic-mirror array according to this embodiment whereas 1 in the conventional dichroic mirror array. Therefore, the difference (optical-path-length difference) between the maximum optical-path length and the minimum optical-path length changes substantially according to the maximum optical-path length. That is, the difference between the maximum optical-path length and the minimum optical-path length can be reduced to about half by adopting the configuration of the dichroic-mirror array according to this embodiment.

FIG. 3 is a diagram illustrating the results of comparing the optical-path lengths of dichroic-mirror arrays having 3 to 13 split ability. FIG. 3 illustrates the maximum optical-path length and the optical-path-length difference between the maximum optical-path length and the minimum optical-path length for each dichroic mirror array in the conventional example and this embodiment.

As is clear from FIG. 3, the maximum optical-path length of this embodiment is reduced as compared with the conventional example for all the dichroic-mirror arrays having 5 or more split ability. Further, for all the dichroic-mirror arrays having 3 or more split ability, the optical-path-length difference of this embodiment is reduced as compared with the conventional example.

Further, as the number of splits increases, the difference in maximum optical-path length increases, and then the effect of this embodiment is remarkable. For example, in a dichroic-mirror array having 9 split ability, the maximum optical-path length is reduced from 9 in the conventional example to 6, and the optical-path-length difference is reduced from 8 in the conventional example to 4. As described above, the reduction of both the maximum optical-path length and the optical-path-length difference is increasing compared to the case of 7 splits. That is, it can be seen that the effect of this embodiment is further higher as the number of splits increases.

As described above, the dichroic-mirror array according to this embodiment includes the dichroic mirrors DA1 to DAm of the group A and the dichroic mirrors DB1 to DBn of the group B having different orientations, and the dichroic mirrors DA1 and DB1 are arranged along the Z-axis direction. As a result, even if the number of dichroic mirrors is increased and the number of splits of the incident light is increased, the increase in maximum optical distance (maximum optical-path length) of the incident light can be suppressed, and it is possible to independently detect the multicolor of the incident light with high sensitivity and accuracy. In addition, the maximum optical distance of the incident light can be reduced without increasing or decreasing the number of dichroic mirrors and the number of splits of the incident light, and even higher accuracy and independent multicolor detection is possible while maintaining highly sensitive multicolor detection of the incident light.

Comparative Example 1

Next, a comparative example and examples of the first embodiment will be described.

Figure 4A:
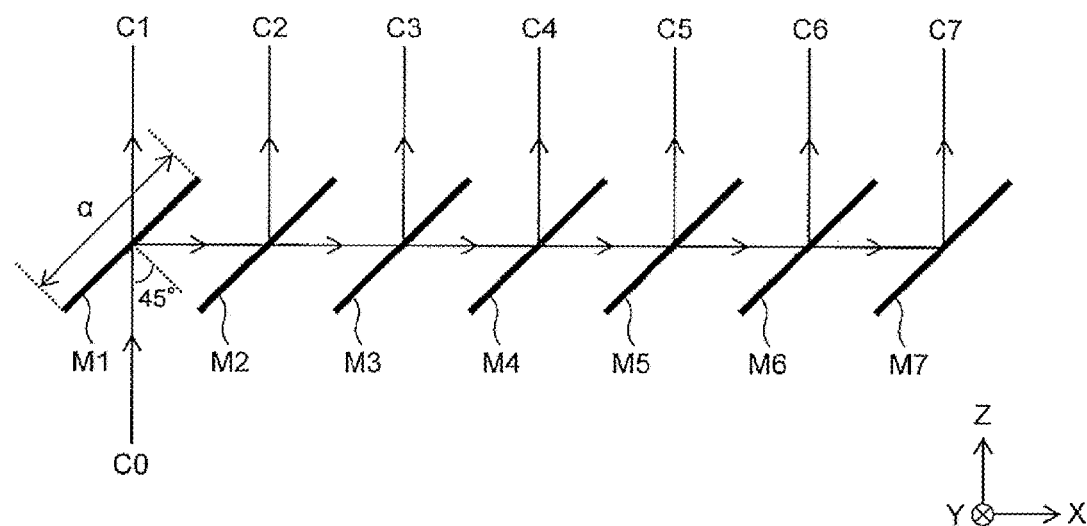
FIGS. 4A and 4B are a cross-sectional view illustrating a configuration and optical-path lengths of a 7-split dichroic-mirror array according to a comparative example 1.

FIG. 4 is a diagram illustrating a dichroic-mirror array according to a comparative example 1. FIG. 4A is a cross-sectional view illustrating the configuration of the dichroic-mirror array according to the comparative example 1.

As illustrated in FIG. 4A, the dichroic-mirror array according to the comparative example 1 includes dichroic mirrors M1 to M7 having different spectral characteristics, and splits the incident light C0 into seven lights. The dichroic mirrors M1 to M7 have a slope of 45° with respect to the XY plane and the YZ plane, and are arranged parallel to each other and at approximately equal intervals along the positive direction of the X axis. The influence of the thickness of each of the dichroic mirrors M1 to M7 is ignored.

Assuming that the width of the dichroic mirrors M1 to M7 parallel to the paper surface of FIG. 4A is α, the dichroic-mirror-array spacing is α/√2. That is, where k is an integer of 1≤k≤6, the right end of the dichroic mirror Mk and the left end of the dichroic mirror M(k+1) have the same X coordinate.

The incident light C0 travels in the positive direction of the Z axis and is incident on the dichroic mirror M1, and is split into a reflected light traveling in the positive direction of the X axis and a transmitted light traveling in the positive direction of the Z axis, that is, a split light C1. The reflected light is incident on the dichroic mirror M2 and is split into a transmitted light traveling in the positive direction of the X axis and a reflected light traveling in the positive direction of the Z axis, that is, a split light C2. Similarly, assuming 3≤k≤6, the transmitted light through the dichroic mirror M(k−1) traveling in the positive direction of the X axis is incident on the dichroic mirror Mk and is split into a transmitted light traveling in the positive direction of the X axis and a reflected light traveling in the positive direction of the Z axis, that is, a split light Ck. The transmitted light through the dichroic mirror M6 and traveling in the positive direction of the X axis is incident on the dichroic mirror M7 and generates a reflected light traveling in the positive direction of the Z axis, that is, a split light C7. By using a total reflection mirror as the dichroic mirror M7, the transmitted light through the dichroic mirror M7 may be eliminated.

From the above, seven split lights C1 to C7 traveling in the positive direction of the Z axis are obtained. Since the split lights C1 to C7 have different wavelength components contained in the incident light C0, it is possible to perform multicolor detection of the incident light C0 by detecting the split lights C1 to C7, respectively.

Figure 4B:
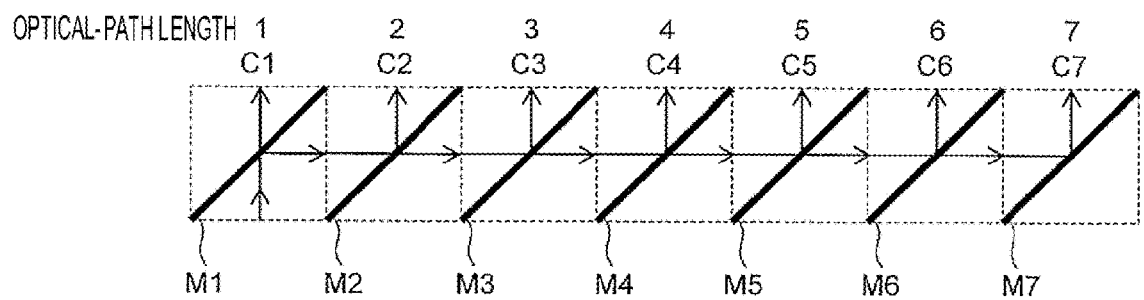

FIG. 4B is a diagram illustrating the optical-path length required for reflected lights or transmitted lights generated by individual dichroic mirrors. The units illustrated by the dotted squares are the same as in FIG. 2, so the description thereof will be omitted.

As is clear from FIG. 4B, the split light C1 has an optical path length of 1 for one unit, the split light C2 has an optical path length of 2 for two units, and similarly, the split light C7 has an optical path length of 7 for seven units. Therefore, in the dichroic-mirror array according to the comparative example 1, the maximum optical-path length is 7, the minimum optical-path length is 1, and the difference between the maximum optical-path length and the minimum optical-path length is 6.

Example 1

Figure 5A:
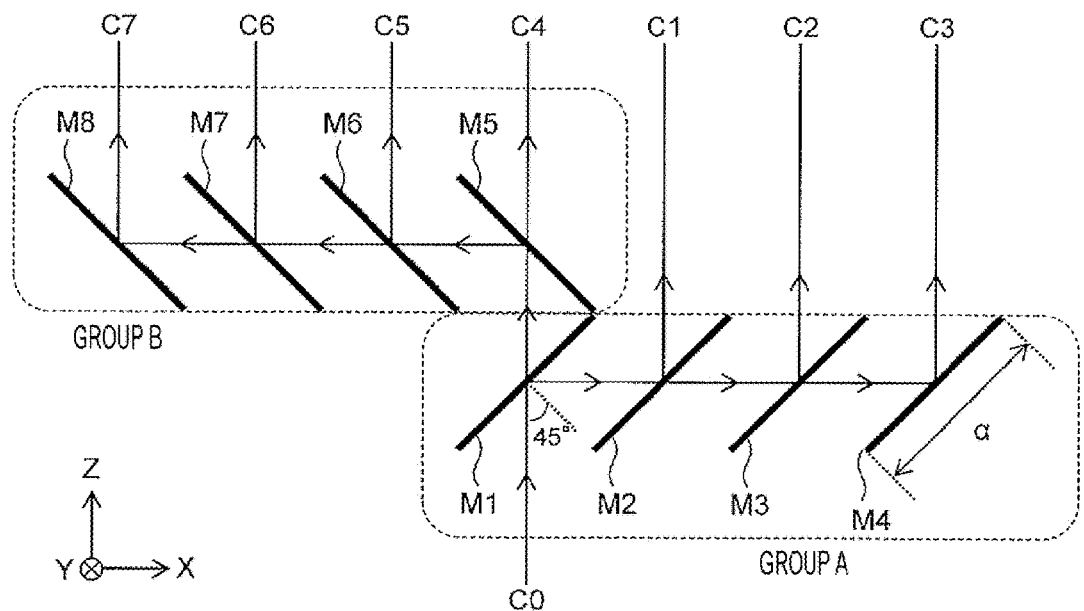
FIGS. 5A and 5B are a cross-sectional view illustrating a configuration and optical-path lengths of the 7-split dichroic-mirror array according to an example 1.

FIG. 5 is a diagram illustrating a dichroic-mirror array according to an example 1. FIG. 5A is a cross-sectional view illustrating the configuration of the dichroic-mirror array according to the example 1.

As illustrated in FIG. 5A, the dichroic-mirror array according to the example 1 includes eight dichroic mirrors M1 to M8 having different spectral characteristics, and can split the incident light C0 into seven lights to make seven split lights C1 to C7. The dichroic mirrors M1 to M4 are classified into the group A, and the dichroic mirrors M5 to M8 are classified into the group B.

The dichroic mirrors M1 to M4 have a slope of 45° with respect to the XY plane and the YZ plane, and are arranged parallel to each other and at approximately equal intervals along the positive direction of the X axis. The normal lines of the incident surfaces of the dichroic mirrors M1 to M4 are parallel to the XZ plane and have a slope of −45° in the XZ plane.

The dichroic mirrors M5 to M8 have a slope of 45° with respect to the XY plane and the YZ plane, and are arranged parallel to each other and at approximately equal intervals along the negative direction of the X axis. The normal lines of the incident surfaces of the dichroic mirrors M5 to M8 are parallel to the XZ plane and have a slope of 45° in the XZ plane.

That is, the dichroic mirrors M1 to M4 and the dichroic mirrors M5 to M8 are arranged so as to face each other and their normal lines are orthogonal to each other.

The dichroic mirror M1 and the dichroic mirror M5 have the same position in the X-axis direction, and the dichroic mirror M5 is arranged on the positive direction side of the Z axis with respect to the dichroic mirror M1. Therefore, the dichroic mirrors M5 to M8 are arranged on the positive direction side of the Z axis with respect to the dichroic mirrors M1 to M4. As described above, the dichroic-mirror array according to the example 1 has a two-layer structure as a whole.

Assuming that the width of the dichroic mirrors M1 to M8 parallel to the XZ plane is $\alpha$, the arrangement spacing of the dichroic mirrors M1 to M4 and the dichroic mirrors M5 to M8 is $\alpha/\sqrt{2}$, respectively. The distance between the center of the dichroic mirror M1 and the center of the dichroic mirror M5 is also $\alpha/\sqrt{2}$.

The incident light C0 travels in the positive direction of the Z axis and is incident on the dichroic mirror M1 at an incident angle of 45°, and is split into a reflected light traveling in the positive direction of the X axis and a transmitted light traveling in the positive direction of the Z axis. The reflected light by the dichroic mirror M1 is incident on the dichroic mirror M2 at an incident angle of 45° and is split into a transmitted light traveling in the positive direction of the X axis and a reflected light traveling in the positive direction of the Z axis, that is, a split light C1. The transmitted light through the dichroic mirror M2 is incident on the dichroic mirror M3 at an incident angle of 45° and is split into a transmitted light traveling in the positive direction of the X axis and a reflected light traveling in the positive direction of the Z axis, that is, a split light C2. The transmitted light through the dichroic mirror M3 is incident on the dichroic mirror M4 at an incident angle of 45°, and generates a reflected light traveling in the positive direction of the Z axis, that is, a split light C3. Here, the transmitted light through the dichroic mirror M4 is ignored.

On the other hand, the transmitted light through the dichroic mirror M1 is incident on the dichroic mirror M5 at an incident angle of 45° and is split into a reflected light traveling in the negative direction of the X axis and a transmitted light traveling in the positive direction of the Z axis, that is, a split light C4. The reflected light by the dichroic mirror M5 is incident on the dichroic mirror M6 at an incident angle of 45° and is split into a transmitted light traveling in the negative direction of the X axis and a reflected light traveling in the positive direction of the Z axis, that is, a split light C5. The transmitted light through the dichroic mirror M6 is incident on the dichroic mirror M7 at an incident angle of 45° and is split into a transmitted light traveling in the negative direction of the X axis and a reflected light traveling in the positive direction of the Z axis, that is, a split light C6. The transmitted light through the dichroic mirror M7 is incident on the dichroic mirror M8 at an incident angle of 45°, and generates a reflected light traveling in the positive direction of the Z axis, that is, a split light C7. Here, the transmitted light through the dichroic mirror M8 is ignored.

The dichroic mirrors M4 and M8 may be total reflection mirrors.

As described above, seven split lights C1 to C7 traveling in the positive direction of the Z axis are obtained. Since the split lights C1 to C7 have different wavelength components contained in the incident light C0, it is possible to perform multicolor detection of the incident light C0 by detecting the split lights C1 to C7, respectively.

Figure 5B:
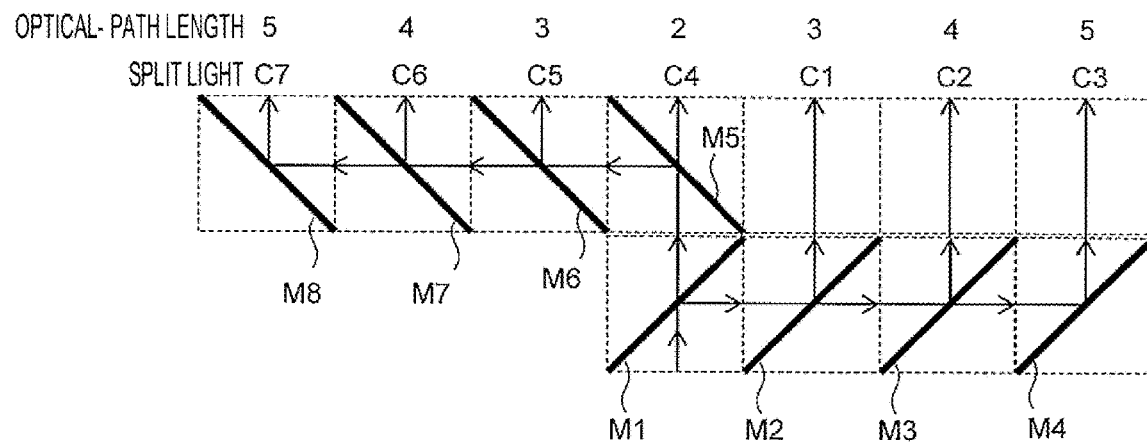

FIG. 5B is a diagram illustrating the optical-path length required for reflected lights or transmitted lights by individual dichroic mirrors. The units illustrated by the dotted squares are the same as descried above, so the description thereof will be omitted.

As illustrated in FIG. 5B, the split light C1 has an optical path length of 3 for three units, the split light C2 has an optical-path length of 4 for four units, the split light C3 has an optical-path length of 5 for five units, the split light C4 has an optical-path length of 2 for two units, the split light C5 has an optical-path length of 3 for three units, the split light C6 has an optical-path length of 4 for four units, and the split light C7 has an optical-path length of 5 for five units. Therefore, the maximum optical-path length is 5, the minimum optical-path length is 2, and the difference between the maximum optical-path length and the minimum optical-path length is 3.

From the comparison of the evaluation results of the optical-path lengths of the comparative example 1 and the example 1, the maximum optical-path length of the dichroic-mirror array according to the example 1 can be reduced from 7 of the comparative example 1 to 5 and the difference between the maximum optical-path length and the minimum optical-path length can be reduced from 6 of the comparative example 1 to 3, while the dichroic-mirror arrays of both the comparative example 1 and the example 1 similarly perform 7-color detection by 7 splits. As described above, the dichroic mirror array according to the example 1 enables seven colors detection with high accuracy, high sensitivity, and low crosstalk.

Since FIGS. 4 and 5 show a cross-sectional view of the dichroic-mirror array, only one incident light C0 is illustrated. However, a plurality of incident lights C0 may be arranged in the direction perpendicular to the paper surface of the cross-sectional view (Y-axis direction), and each of the plurality of incident lights C0 may be split into seven lights in parallel by the dichroic-mirror array to generate split lights C1 to C7.

Example 2

FIG. 6 is a schematic diagram illustrating a configuration of a multicolor detector according to an example 2. The multicolor detector according to the example 2 is a device that perform seven-color detection of light emitted from one light-emission point P by using the dichroic-mirror array according to the example 1.

Figure 6A:
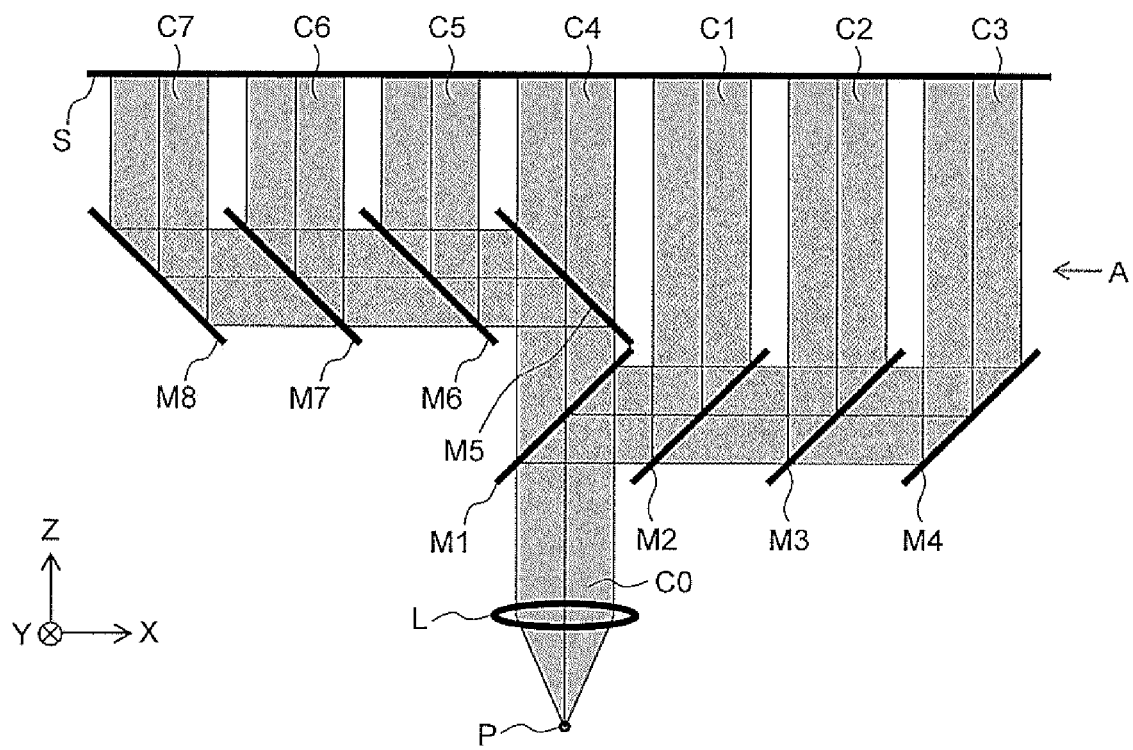
FIGS. 6A and 6B are a schematic diagram illustrating a configuration of a multicolor detector according to an example 2.
Figure 6B:
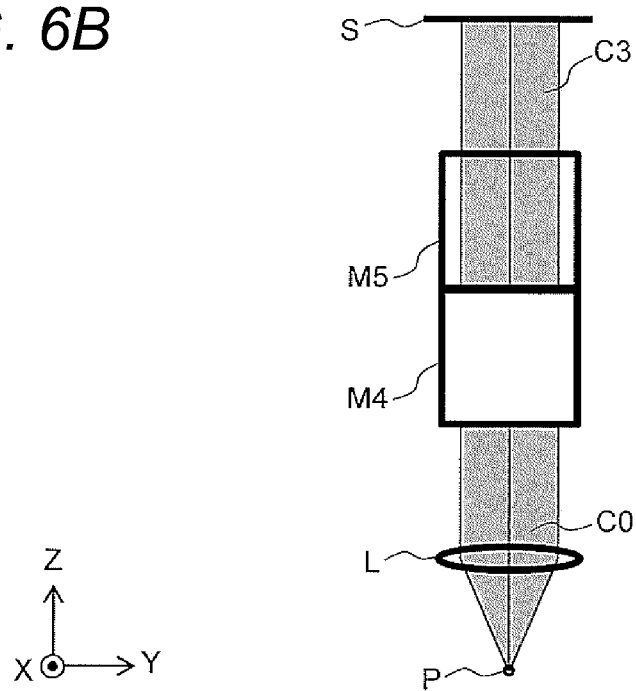

The incident light C0 is a light flux obtained by condensing the light emitted from the light-emission point P with a condensing lens L. In FIG. 5, each light flux is illustrated by a line, whereas each light flux in FIG. 6 is illustrated by a bundle (light flux) having a width. FIG. 6A is a cross-sectional view of the multicolor detector according to this example parallel to the XZ plane. FIG. 6B is a view taken along arrow A in FIG. 6A.

As illustrated in FIG. 6A, the multicolor detector according to the example 2 includes the dichroic mirrors M1 to M8, the condensing lens L, the sensor array, and the light-emission point P.

Since the dichroic mirrors M1 to M8 have the same configuration as that of the example 1, the description thereof will be omitted.

The sensor array has seven sensor elements arranged parallel to the XY plane along the X-axis direction, and each sensor element is arranged on the positive direction side of the Z axis from the dichroic mirrors M1 to M8. The seven split lights C1 to C7 travel in the positive direction of the Z axis, are respectively incident on the sensor surfaces S of the sensor elements, and are detected by the sensor array. Note that, in FIG. 6, the boundaries of the sensor surfaces S of the plurality of sensor elements are not illustrated. The sensor array is a single line sensor or area sensor. Since the split lights C1 to C7 are components of different wavelength bands of the incident light C0, that is, components of different colors, it is possible to perform seven-color detection of the incident light C0 by measuring them simultaneously and independently.

In the example 2, since there is one light-emission point P, the width of each dichroic mirror in the Y-axis direction should be larger than the maximum width of the light fluxes of the incident light C0 and the split lights C1 to C7 as illustrated in FIG. 6B.

As described above, the multicolor detector according to the example 2 can reduce the maximum optical-path length and the optical-path-length difference as compared with the case where the dichroic-mirror array according to the comparative example 1 is used, as in the example 1. Therefore, it is possible to perform multicolor detection of the light emitted from the light-emission point P with high accuracy and high sensitivity.

Example 3

Figure 7A:
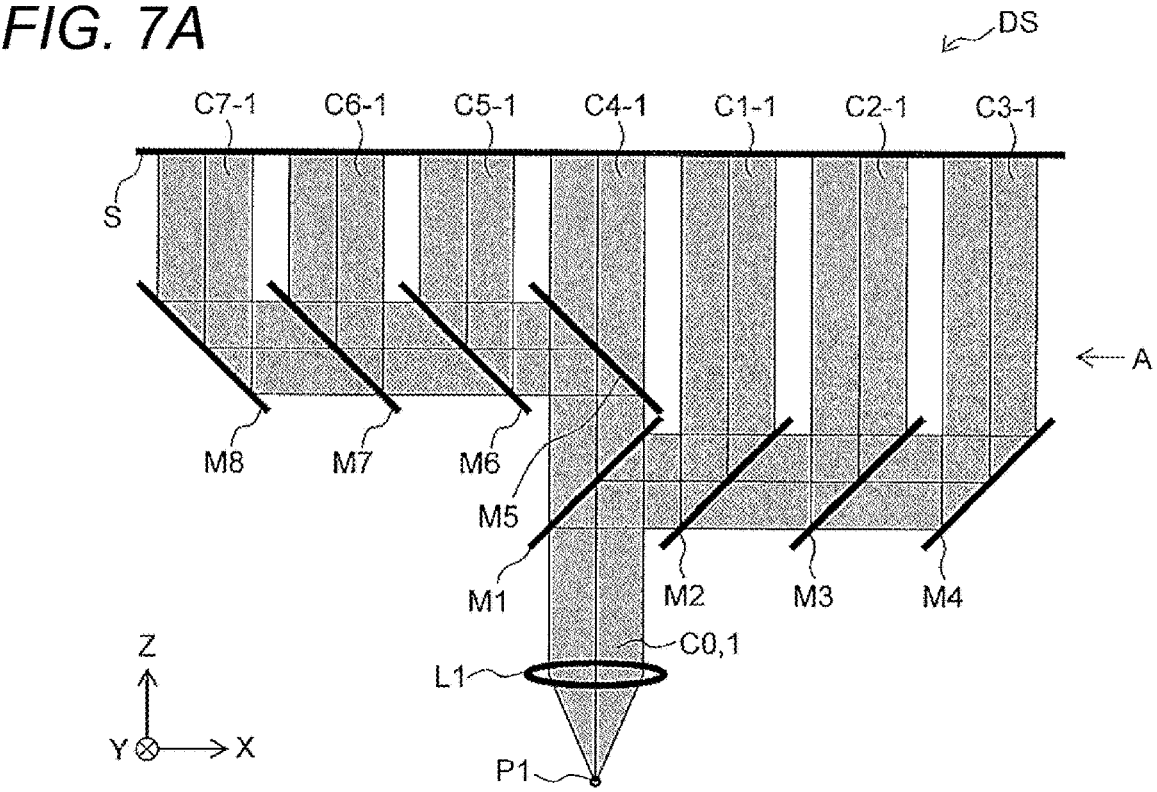
FIGS. 7A and 7B are a schematic diagram illustrating a configuration of a multicolor detector according to an example 3.
Figure 7B:
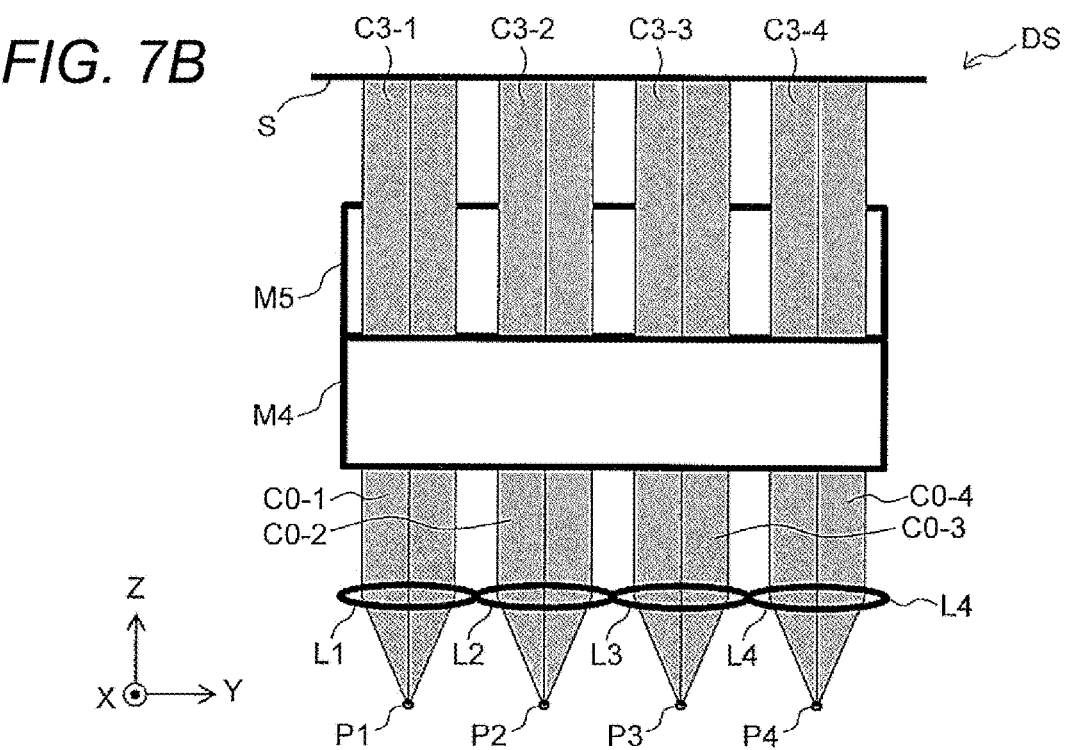

FIG. 7 is a schematic diagram illustrating a configuration of a multicolor detector DS according to an example 3. The multicolor detector DS according to the example 3 is a multicolor detector that perform seven-color detection of each light emitted from p ($2 \leq p$) light-emission points P by using the same dichroic-mirror array as in the example 1. In the example 3, seven colors of lights emitted from the four-light-emission points P1 to P4 are detected. FIG. 7A is a cross-sectional view of the multicolor detector DS according to this example parallel to the XZ plane. FIG. 7B is a diagram taken along arrow A in FIG. 7A.

As illustrated in FIGS. 7A and 7B, the multicolor detector DS according to the example 3 includes the dichroic mirrors M1 to M8, condensing lenses L1 to L4, area sensor, and the light-emission points P1 to P4.

The lights emitted from the light-emission points P1 to P4 are condensed by the condensing lenses L1 to L4, respectively, and becomes incident lights C0-1 to C0-4. The number of light-emission points P is not limited to four, and can be any number.

The dichroic mirrors M1 to M8 have a larger width in the Y-axis direction than that of the dichroic mirrors of the example 1 so that the incident lights C0-1 to C0-4 can be commonly incident on them. The dichroic mirrors M1 to M8 split each of the incident lights C0-1 to C0-4 into seven to obtain 28 split lights C1-1 to C7-4.

The area sensor is arranged parallel to the XY plane on the positive direction side of the Z axis from the dichroic mirrors M1 to M8. The 28 split lights C1-1 to C7-4 are commonly incident on a sensor surface S of the one area sensor and are detected by the area sensor.

In the present disclosure, the expression "common" may be used to mean that one optical element is used for a plurality of (M) light-emission points, light fluxes, or split lights (M:1 correspondence). On the contrary, the expression "individual" may be used to mean that one optical element is used for one light-emission point, one light flux, or one split light (1:1 correspondence).

When detecting the 28 split lights C1-1 to C7-4 individually, a sensor array having a total of 28 sensor elements, 4 in the Y-axis direction and 7 in the X-axis direction, is used. Each sensor element is arranged parallel to the XY plane on the positive direction side of the Z axis from the dichroic mirrors M1 to M8. The 28 split lights C1-1 to C7-4 are incident on the sensor surfaces S of the sensor elements, respectively, and are detected by the sensor array.

As described above, the multicolor detector DS according to the example 3 can reduce the maximum optical-path length and the optical-path-length difference for the plurality of incident lights C0-1 to C0-4 as in the example 1 when compared with the case where the dichroic-mirror array according to the comparative example 1 is used. Therefore, the lights emitted from the plurality of light-emission points P can be detected in multiple colors with high accuracy, high sensitivity, and low crosstalk.

Example 4

Figure 8A:
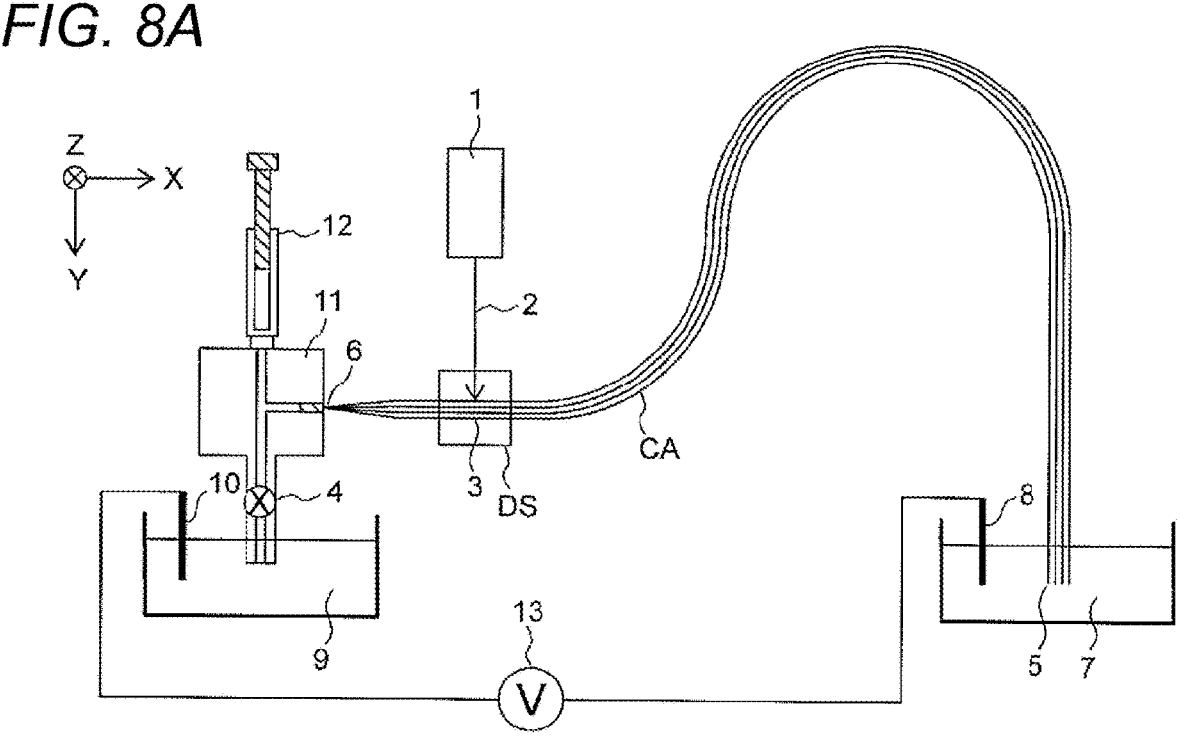
FIGS. 8A and 8B are a schematic diagram illustrating a configuration of a capillary-array DNA sequencer according to an example 4.

FIG. 8A is a schematic diagram illustrating a configuration of a capillary-array DNA sequencer according to an example 4. The capillary-array DNA sequencer according to the example 4 uses the multicolor detector DS according to the example 3, and is an analyzer that detects fluorescence emitted from DNA fragments.

The capillary-array DNA sequencer includes a laser-light source 1, a valve 4, a cathode-side buffer solution 7, a cathode 8, an anode-side buffer solution 9, an anode 10, a pump block 11, a syringe 12, a power source 13, a capillary array CA, and the multicolor detector DS.

The laser-light source 1 irradiates a laser beam 2 to a laser-beam-irradiation position 3 of the capillary array CA. The laser-beam-irradiation position 3 is a position where the DNA fragments are electrophoresed a certain distance from sample-injection ends 5.

The capillary array CA has a plurality of capillaries, and the plurality of capillaries in the vicinity of the laser-beam-irradiation position 3 are arranged on the XY plane. The sample-injection ends 5 of the capillary array CA is immersed in the cathode-side buffer solution 7, and sample-elution ends 6 is immersed in the anode-side buffer solution 9 via a polymer solution in a pump block 11.

The pump block 11 is filled with the polymer solution. The syringe 12 and the valve 4 are coupled to the pump block 11. By pressurizing the polymer solution inside the pump block 11 by using the syringe 12 with the valve 4 closed, the capillary array CA are filled with the polymer solution from the sample-elution ends 6 toward the sample-injection ends 5.

The cathode 8 is immersed in the cathode-side buffer solution 7, and the anode 10 is immersed in the anode-side buffer solution 9. The power source 13 applies a high voltage between the cathode 8 and the anode 10.

After filling the inside of the capillary array CA with the polymer solution, the valve 4 is opened, different samples are respectively injected into the capillaries from the sample-injection ends 5, and a high voltage is applied between the cathode 8 and the anode 10 to perform capillary electrophoresis. The DNA fragments labeled with four kinds of fluorophores contained in the samples are electrophoresed from the sample-injection ends 5 to the sample-elution ends 6.

Figure 8B:
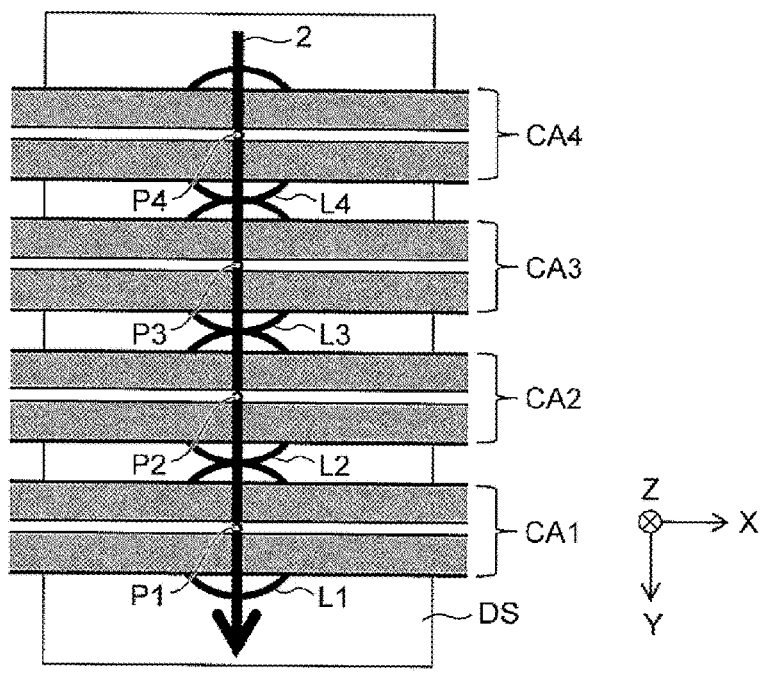

FIG. 8B is an enlarged view of the multicolor detector DS illustrated in FIG. 8A. As illustrated in FIG. 8B, the capillary array CA includes four capillaries CA1 to CA4. The number of capillaries is not limited to four and can be any number.

The capillaries CA1 to CA4 are arranged along the Y-axis direction on the XY plane, and their coating is removed at the laser-beam-irradiation position 3. The DNA fragments labeled with the four kinds of fluorophores are electrophoresed inside each of the capillaries CA1 to CA4, and are excited to emit fluorescence when passing through the laser-beam-irradiation position 3. Therefore, the insides of the capillaries CA1 to CA4 at the laser-beam-irradiation position 3 become the light-emission points P1 to P4, respectively.

Since the multicolor detector DS has the same configuration as the multicolor detector DS according to the example 3, the description thereof will be omitted. The multicolor detector DS is arranged on the positive direction side of the Z axis from the capillary array CA.

As illustrated in FIG. 8B, the laser beam 2 oscillated from the laser-light source 1 travels in the positive direction of the Y axis along the XY plane, and collectively irradiates the laser-beam-irradiation position 3 of the capillaries CA4, CA3, CA2, and CA1, that is, the light-emission points P4, P3, P2, and P1.

The DNA fragments labeled with the four kinds of fluorophores are excited by the laser beam 2 as they pass through the laser-beam-irradiation position 3. The resulting emissions from the light-emission points P1 to P4 are detected in 7 colors using the multicolor detector DS. The wavelength of the laser beam 2 is 505 nm. Wavelengths of fluorescence of the four kinds of fluorophores (maximum light-emission wavelength) is 540 nm, 570 nm, 600 nm, and 630 nm.

As described above, while the analysis target is the four kinds of fluorophores, the multicolor detector DS can detect seven colors, and then it is possible to independently detect fluorescence of the four kinds of fluorophores with high accuracy. Therefore, the capillary-array DNA sequencer of this example can make analysis with high accuracy, high sensitivity, and low crosstalk.

Example 5

Figure 9:
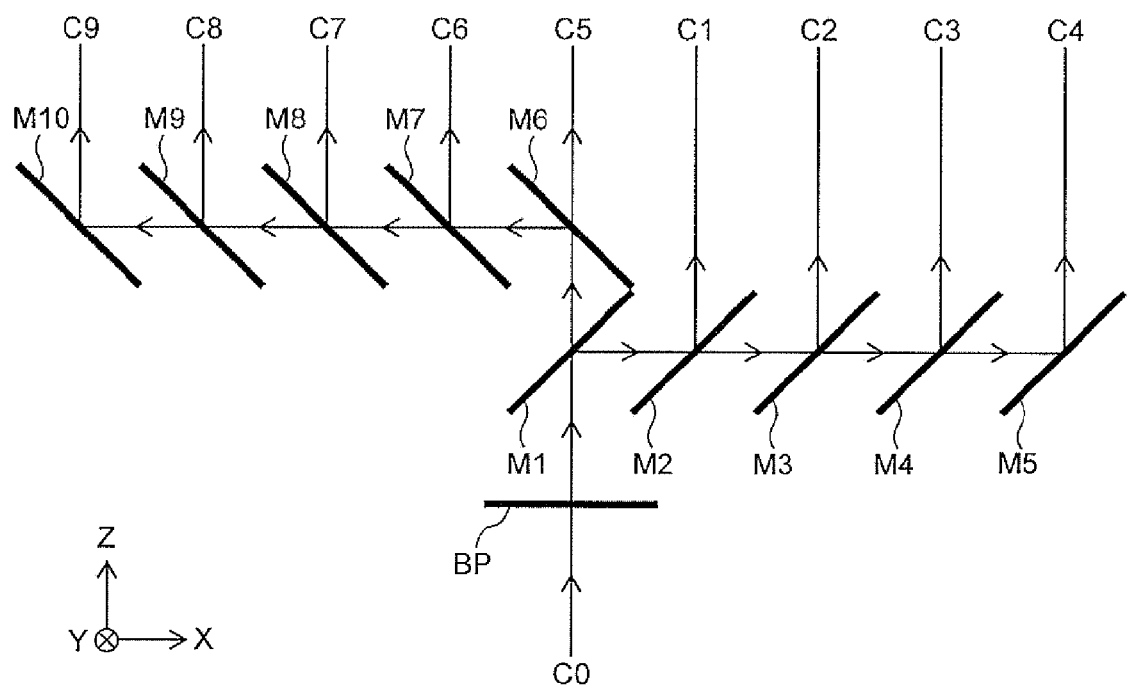
FIG. 9 is a cross-sectional view illustrating a configuration of a 9-split dichroic-mirror array according to an example 5.

FIG. 9 is a cross-sectional view illustrating a configuration of a dichroic-mirror array according to an example 5. The configuration unless otherwise described is the same as that of the example 1. The dichroic-mirror array according to the example 5 includes 10 dichroic mirrors M1 to M10, and can detect nine colors by splitting the incident light C0 into 9 lights. Although not illustrated, the dichroic mirrors M1 to M5 are classified into the group A, and the dichroic mirrors M6 to M10 are classified into the group B.

The dichroic mirror M5 located at the end in the positive direction of the X axis of the group A and the dichroic mirror M10 located at the end in the negative direction of the X axis of the group B are dichroic mirrors having the same spectral characteristics. The dichroic mirrors M5 and M10 may be, for example, total reflection mirrors.

As illustrated in FIG. 9, the dichroic-mirror array according to the example 5 is different from the examples 1 to 4 in that the bandpass filter BP (first filter) is provided on the negative direction side of the Z axis from the dichroic mirror M1. Since other configurations are the same as those of the dichroic-mirror array of the example 1, the description thereof will be omitted.

The shape of the bandpass filter BP is the same as that of the dichroic mirrors M1 to M10. The bandpass filter BP is arranged on the negative direction side of Z axis from the dichroic mirror M1 in parallel with the XY plane. That is, the normal lines of the incident surface and the exit surface of the bandpass filter BP are parallel to the Z axis. By having the bandpass filter BP, the light of a predetermined wavelength band among a plurality of wavelength bands included in the incident light C0 is transmitted and incident on the dichroic mirror M1, whereby only the light of the desired wavelength band can be detected in multiple colors.

The incident light C0 travels in the positive direction of the Z axis and is incident on the bandpass filter BP at an incident angle of 0°, whereby a transmitted light traveling in the positive direction of the Z axis is generated. The transmitted light through the bandpass filter BP is incident on the dichroic mirror M1 at an incident angle of 45° and is split into a reflected light traveling in the positive direction of the X axis and a transmitted light traveling in the positive direction of the Z axis. The reflected light by the dichroic mirror M1 is incident on the dichroic mirror M2 at an incident angle of 45° and is split into a transmitted light traveling in the positive direction of the X axis and a reflected light traveling in the positive direction of the Z axis, that is, a split light C1. In the same manner below, the split lights C1 to C4 are obtained by the dichroic mirrors M2 to M5. The transmitted light through the dichroic mirror M5 is ignored.

On the other hand, the transmitted light through the dichroic mirror M1 is incident on the dichroic mirror M6 at an incident angle of 45° and is split into a reflected light traveling in the negative direction of the X axis and a transmitted light traveling in the positive direction of the Z axis, that is, a split light C5. The reflected light by the dichroic mirror M6 is incident on the dichroic mirror M7 at an incident angle of 45° and is split into a transmitted light traveling in the negative direction of the X axis and a reflected light traveling in the positive direction of the Z axis, that is, a split light C6. In the same manner below, the split lights C5 to C9 are obtained by the dichroic mirrors M6 to M10. The transmitted light through the dichroic mirror M10 is ignored.

As described above, the dichroic-mirror array according to the example 5 can obtain nine split lights C1 to C9 traveling in the positive direction of the Z axis. Since the split lights C1 to C9 have different wavelength components of the incident light C0, it is possible to perform 9-color detection of the incident light C0 by detecting the split lights C1 to C9 respectively.

Comparative Example 2

A dichroic-mirror array according to a comparative example 2 is the same as that of the comparative example 1 except that the nine dichroic mirrors M1 to M9 are used, and the bandpass filter BP is arranged on the negative direction side in the Z axis from the dichroic mirror M1 to be parallel to the XY plane.

<Evaluation of Maximum Optical-Path Length and Optical-Path-Length Difference>

Next, with reference to FIGS. 10 to 13, the results obtained by practical calculation of the maximum optical-path length and the optical-path-length difference for the 9-color detector using the dichroic-mirror array according to the example 5 or the comparative example 2 will be explained.

In the following, the device using the dichroic-mirror array of the example 5 is referred to as "the 9-color detector of this example", and the device using the dichroic-mirror array of the comparative example 2 is referred to as "the 9-color detector of the comparative example".

Although not illustrated, the 9-color detector of this example or the comparative example include the condensing lens L, the dichroic-mirror array of the example 5 or the comparative example 2, and the area sensor. In the 9-color detectors of this example and the comparative example, the light flux(es) obtained by condensing the light(s) emitted from one or a plurality of light-emission points P by the condensing lens(es) L is or are defined as the incident light(s) C0, and the nine split lights C1 to C9 are generated for each C0 by the dichroic-mirror array, and the split lights C1 to C9 are detected by making them perpendicularly enter the sensor surface S of the area sensor.

As illustrated in FIG. 3, in the case of 9 splits, the maximum optical-path length of the 9-color detector of the comparative example is 9, the optical-path-length difference is 8, and the optical path lengths of the split lights C1 to C9 are 1 to 9. On the other hand, the maximum optical-path length of the 9-color detector of this example is 6, the optical-path-length difference is 4, and the optical-path lengths of the split lights C1 to C9 are 2 to 6. Here, as an example, when the optical-path length of 1 is converted to 2.5 mm, the optical-path length of the 9-color detector of the comparative example is 2.5 to 22.5 mm, and the optical-path length of the 9-color detector of this example is 5.0 to 15.0 mm.

Figure 10A:
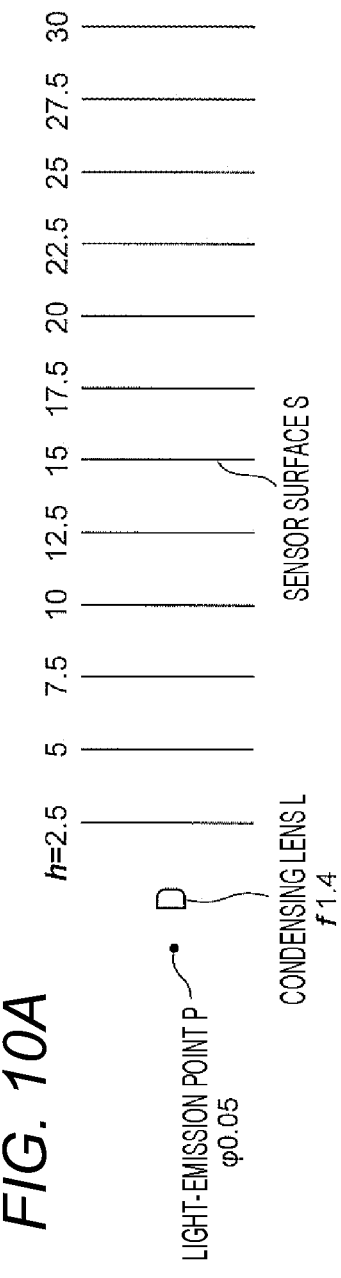
FIGS. 10A and 10B are a model diagram for obtaining a ray-tracing-simulation based relationship among a light-emission-point size, a focal length of a condensing lens, a light-emission-point distance, a sensor distance, and a spot size.
Figure 10B:
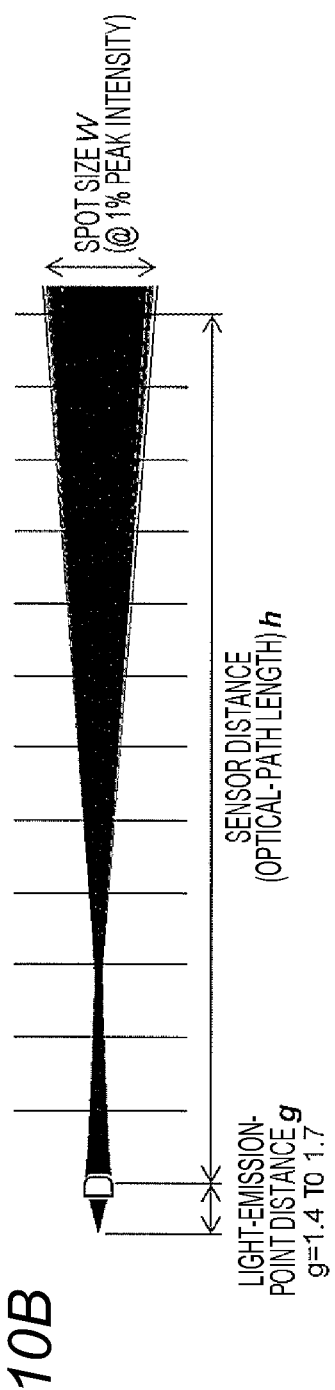
Figure 11:
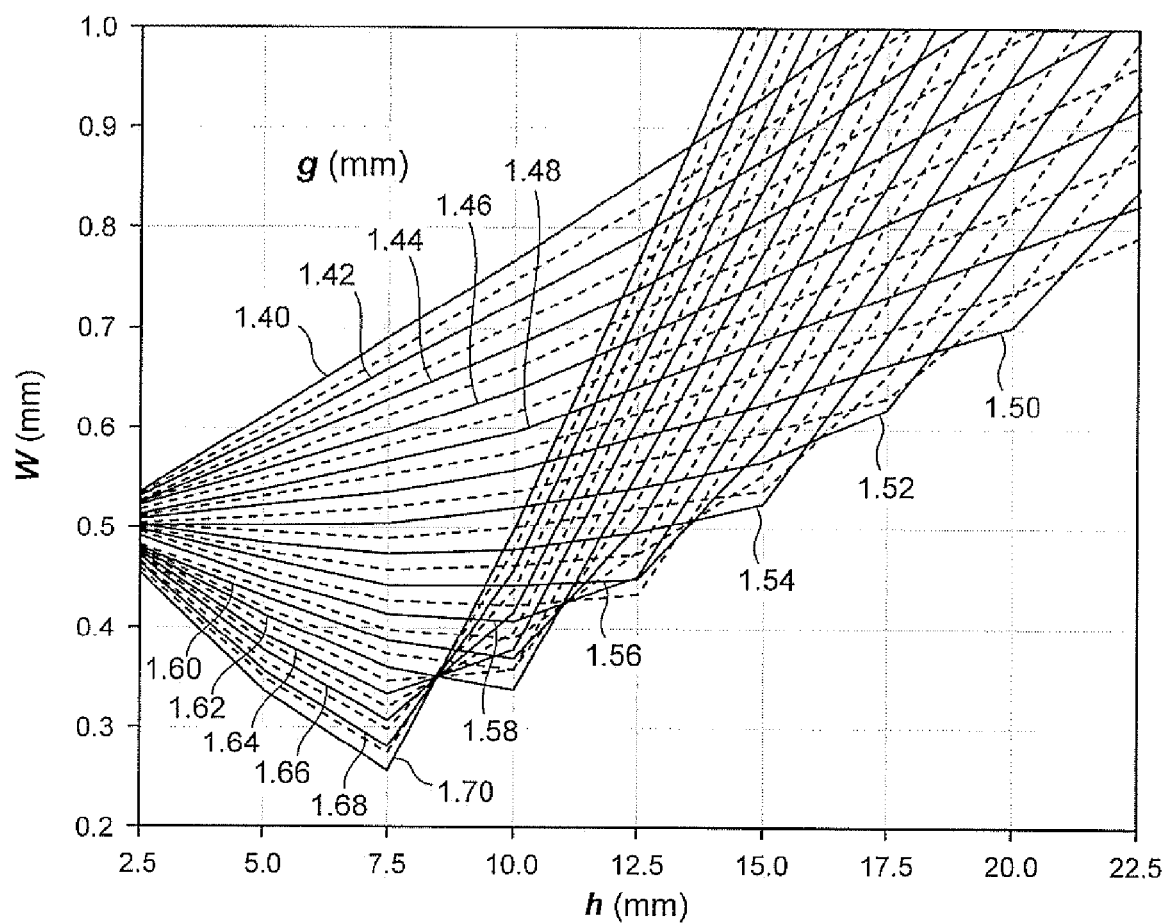
FIG. 11 is a graph illustrating calculation results of the model of FIG. 10.

For each of the 9-color detectors, size of the spots formed by the split lights C1 to C9 on the sensor surface S has been determined by ray-tracing simulation. Furthermore, the effect of mutual crosstalk on the spectral analysis accuracy when detecting the split lights C1 to C9 derived from a single light-emission point, and the effect of mutual crosstalk on independent measurement when detecting the split light Ck ($1 \leq k \leq 9$) derived from the plurality of light-emission points have been evaluated. The results are illustrated in FIGS. 10 and 11.

FIG. 10 is a model diagram for obtaining a relationship among size of the light-emission point P, focal length f of the condensing lens L, light-emission-point distance g, sensor distance h, and spot size W by ray-tracing simulation. Light-emission-point distance g is distance between the light-emission point P and the condensing lens L. Sensor distance h is the optical distance (optical-path length) between the condensing lens L and the sensor surface S. Spot size W is size of a spot formed by projecting the light flux onto the sensor surface S. Here, the light flux is obtained by condensing the light emitted from the light-emission point P by the condensing lens L.

The light-emission point P is arranged on the left side, the condensing lens L is arranged on the right side thereof, and the sensor surface S of the sensor is arranged on the right side thereof. FIG. 10A illustrates an example of a state without light emission, and FIG. 10B illustrates an example of a state with light emission. FIG. 10B depicts only the rays focused by the condensing lens L among the light emitted from the light-emission point P. As an example, the light-emission point P is a circle having a diameter of d=0.05 mm. The condensing lens L has an effective diameter of D=1 mm and a focal length of f=1.4 mm. As the condensing lens L, a lens which has a flat surface on the left side (light-emission-point side) and an aspherical surface on the right side (sensor side), and has a relatively less aberration is selected.

Light-emission-point distance g is changed in 0.01 mm increments in the range of 1.40 mm$\leq$g$\leq$1.70 mm. Sensor distance h is changed in 2.5 mm increments in the range of 2.5 mm$\leq$h$\leq$30 mm for each light-emission-point distance g. Spot size W for each sensor distance h has been calculated. Spot size W has been calculated as the total width of the region where the intensity is 1% or more of the maximum intensity in the intensity distribution of the spot.

FIG. 11 is a graph illustrating calculation results in the model of FIG. 10. In FIG. 11, light-emission-point distance g is used as a parameter, a horizontal axis is sensor distance h, and a vertical axis is spot size W. Note that, the horizontal axis shows only the range of 2.5 mm$\leq$h$\leq$22.5 mm. Solid lines indicate calculation results when the second decimal place of light-emission-point distance g is an even number, and the dotted lines indicate calculation results when the second decimal place of the light-emission-point distance g is an odd number.

Since the light-emission point P has a finite size (d=0.05 mm>0 mm), light (light flux) obtained by condensing light emitted from the light-emission point P by the condensing lens L is not a completely parallel light (light flux) under any condition, and thus, spot size W increases as sensor distance h increases when sensor distance h is sufficiently large. Light-emission-point distance g=1.40 mm is a condition in which the light-emission-point P is located at the focal point of the condensing lens L and is a condition in which light (light flux) is closest to parallel, so that spot size W is minimized at infinity, that is, when sensor distance h is sufficiently large. Here, the expression "minimum" means that spot size W is minimized when light-emission-point distance g is changed at the same sensor distance h. The state in which spot size W is minimized at the same sensor distance h corresponds to the state in which light flux obtained by condensing light emitted from the light-emission point P by the condensing lens L is just focused at the sensor distance h.

As illustrated in FIG. 11, as compared with the case where light-emission-point distance is g=1.40 mm, sensor distance h at which spot size W is minimized decreases as light-emission-point distance g increases. For example, when g=1.50 mm and h=20.0 mm, spot size is the minimum value of W=0.70 mm. When g=1.54 mm and h=15.0 mm, spot size is the minimum value of W=0.52 mm. When g=1.62 mm and h=10.0 mm, spot size is the minimum value of W=0.34 mm. Alternatively, when g=1.70 mm and h=7.5 mm, spot size is the minimum value of W=0.26 mm.

When optical-path length h of each split light generated by a dichroic-mirror array is h (min)$\leq$h$\leq$h (max), the overlap between different spots is the smallest when light-emission-point distance g is selected such that the maximum value of spot size W in h (min)$\leq$h$\leq$h (max) is minimized. This gives the most advantageous condition for highly accurate multi-color detection or independent measurement of different emission points. As can be seen from FIG. 11, the maximum value of spot size W in h (min)$\leq$h$\leq$h (max) is minimized when light-emission point P is just focused at h=h (max).

Another finding obtained from FIG. 11 is that, in each curve in which light-emission-point distance g is fixed, with sensor distance h that gives just focus as the boundary, spot size W changes gradually with sensor distance h on the left side of the boundary (the direction in which sensor distance h is smaller than the boundary), whereas spot size W changes steeply with sensor distance h on the right side of the boundary (the direction in which sensor distance h is larger than the boundary). On the other hand, when sensor distance h is fixed, with light-emission-point distance g that gives just focus as the boundary, spot size W changes gradually with light-emission-point distance g on the side smaller than the boundary, whereas spot size W changes steeply with light-emission-point distance g on the side larger than the boundary. Therefore, when designing a multicolor detector, it may be preferable to set sensor distance h and light-emission-point distance g to a smaller value than the optimum value in consideration of the installation error of each element.

As described above, the optimum condition of the 9-split dichroic-mirror array of the comparative example 2 is when, because optical-path length h is 2.5 mm≤h≤22.5 mm, the light-emission point P is just focused at h=22.5 mm, that is, when the maximum value of spot size W is minimized when g=1.49 mm. In fact, as illustrated in FIG. 11, when g=1.49 mm and h=22.5 mm, the spot size is the minimum value of W=0.79 mm. Further, under the condition of 2.5 mm≤h≤22.5 mm, spot size W is the minimum value of W=0.51 mm when h=2.5 mm. On the other hand, for example, if g=1.50 mm, spot size W at h=2.5 mm is smaller than when g=1.49 mm, but spot size W at h=22.5 mm is larger than when g=1.49 mm to be W=0.84 mm. Alternatively, if g=1.48 mm, spot size W in the entire region of 2.5 mm≤h≤22.5 mm is larger than when g=1.49 mm. From the above, the optimum condition is obtained when g=1.49 mm, that is, when the light-emission point is just focused at h=22.5 mm, and spot size W is 0.51 mm≤W≤0.79 mm when 2.5 mm≤h≤22.5 mm.

Similarly, the optimum condition of the 9-split dichroic-mirror array according to the example 5 is when, because optical-path length h is 5.0 mm≤h≤15.0 mm, the light-emission point P is just focused at h=15.0 mm, that is, when the maximum value of spot size W is minimized when g=1.54 mm. In fact, as illustrated in FIG. 11, when g=1.54 mm and h=15.0 mm, the spot size is the minimum value of W=0.52 mm. Further, under the condition of 5.0 mm≤h≤15.0 mm, spot size W is the minimum value of W=0.47 mm when h=7.5 mm. On the other hand, for example, if g=1.55 mm, spot size W at 5.0 mm≤h≤12.5 mm is smaller than when g=1.54 mm, but spot size W at h=15.0 mm is larger than when g=1.54 mm to be W=0.55 mm. Alternatively, if g=1.53 mm, spot size W in the entire region of 5.0 mm≤h≤15.0 mm is larger than that when g=1.54 mm. From the above, the optimum condition is obtained when g=1.54 mm, that is, when the light-emission point P is just focused at h=15.0 mm, and spot size W is 0.47 mm≤W≤0.52 mm when 5.0 mm≤h≤15.0 mm.

FIG. 12 is a diagram illustrating a signal-intensity distribution on a straight line passing through a center of a spot obtained when the sensor is arranged at the position of optical-path length h, with optical-path length h as a parameter. The horizontal axis represents the spatial coordinates on the straight line with the center of the spot as zero, and the vertical axis represents the relative signal intensity.

The volume of the rotational body of each signal-intensity distribution around the central axis (a straight line passing through zero on the horizontal axis and parallel to the vertical axis) corresponds to the total intensity of each spot and is equal to each other. FIG. 11 illustrates the width of the region having a signal intensity of 1% or more of the signal intensity at the central axis of each signal intensity distribution as spot size W.

Figure 12A:
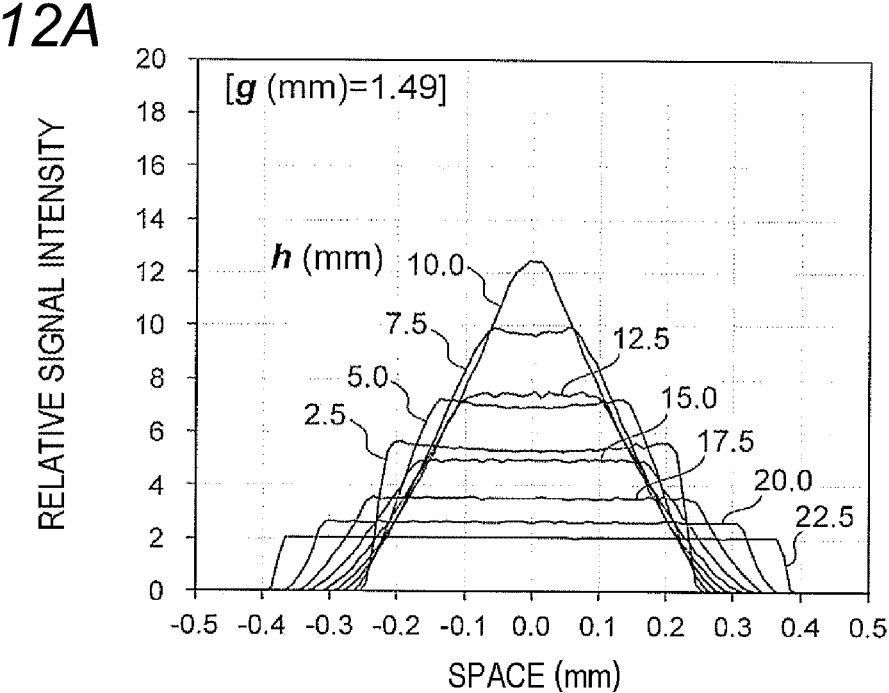
FIGS. 12A and 12B are a graph illustrating a relationship between spatial coordinates with a center of a spot as zero and a relative signal intensity at each sensor distance of a 9-color detector.

FIG. 12A illustrates the signal-intensity distribution of the spots when optical-path length h is h=2.5, 5.0, 7.5, 10.0, 12.5, 15.0, 17.5, 20.0, and 22.5 mm under the optimum conditions for the 9-split dichroic-mirror array of the comparative example 2, that is, under the condition of g=1.49 mm. Since the light-emission point P is just focused at h=22.5 mm, the signal-intensity distribution at h=22.5 mm is closest to the rectangular shape.

Figure 12B:
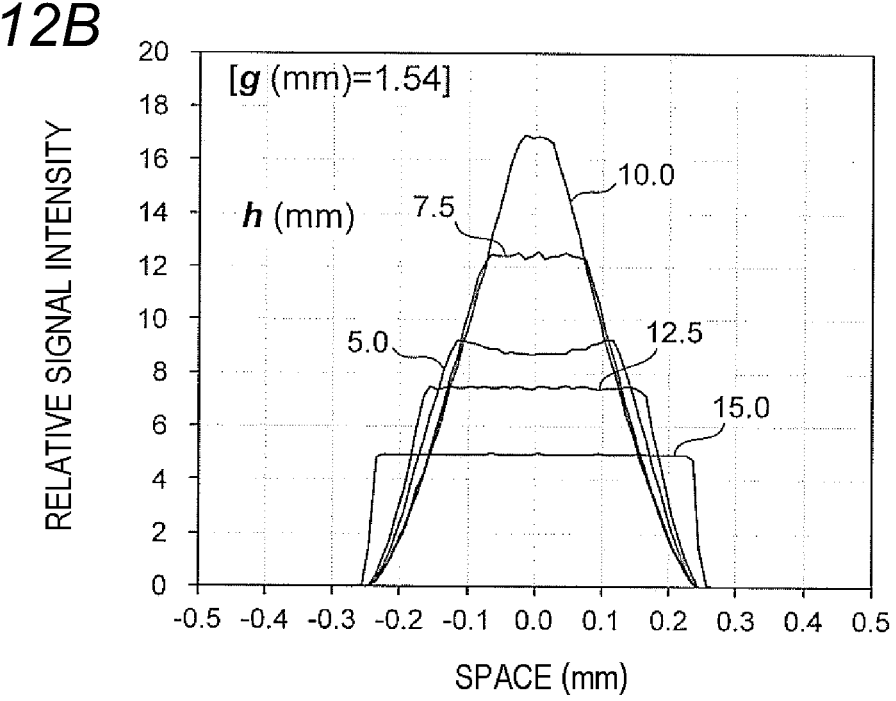

On the other hand, FIG. 12B illustrates the signal signal-intensity distribution of the spots when optical-path length h is h=5.0, 7.5, 10.0, 12.5 and 15.0 mm under the optimum conditions for the 9-split dichroic-mirror array according to the example 5, that is, under the condition of g=1.54 mm. Since the light-emission point P is just focused at h=15.0 mm, the signal-intensity distribution at h=15.0 mm is closest to the rectangular shape.

As illustrated in FIG. 12, the longer the maximum optical-path length of the dichroic-mirror array and the larger the optical-path-length difference, the more the signal intensity distribution of the spots obtained by using the dichroic-mirror array fluctuates. Therefore, it is illustrated more prominently than in FIG. 11 that simultaneous measurement is difficult in the above.

For example, in FIG. 12A, the signal intensity at the central axis is 12.4 when h=10.0 mm, whereas the signal intensity at the central axis is 2.0 when h=22.5 mm. Therefore, it is necessary to simultaneously measure a plurality of different spots having a signal-intensity ratio of 12.4/2.0=6.2. When the signal-intensity ratio is large, the large signal intensity may exceed the saturation level of the sensor, while the small signal intensity may not reach the saturation level of the sensor, which causes a problem that the effective dynamic range of signal measurement is reduced.

On the other hand, in FIG. 12B, when h=10.0 mm, the signal intensity at the central axis is 16.6, whereas when h=15.0 mm, the signal intensity at the central axis is 4.9. Therefore, the signal-intensity ratio is 16.6/4.9=3.4, which is suppressed to about half of that in the case of FIG. 12A, and the above problem can be avoided.

Figure 13A:
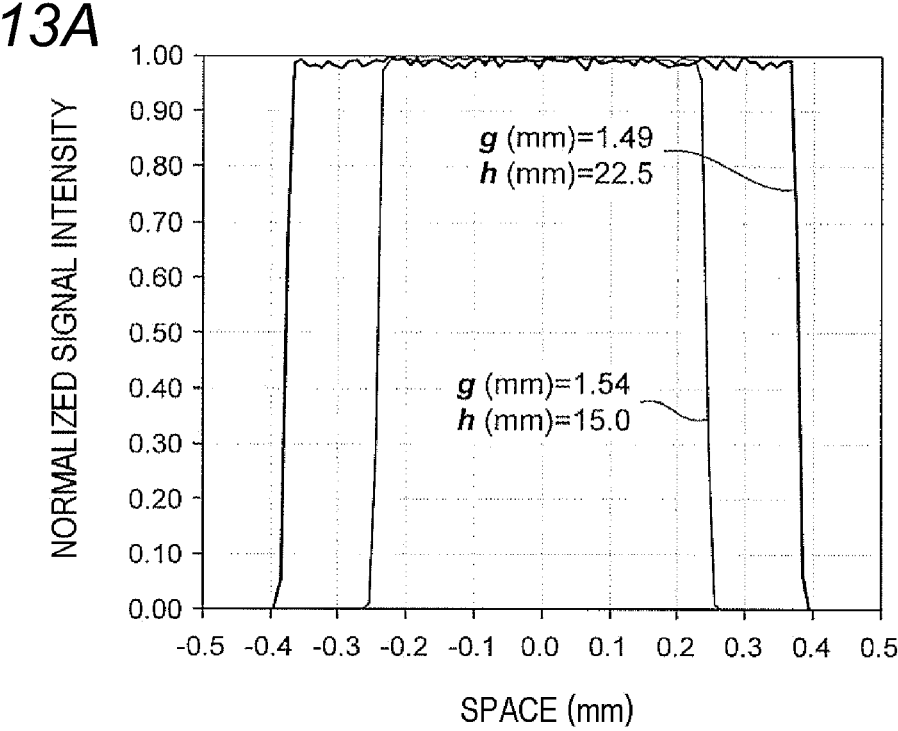
FIGS. 13A and 13B are a graph illustrating a relationship between the spatial coordinates of a spot and a normalized signal intensity.
Figure 13B:
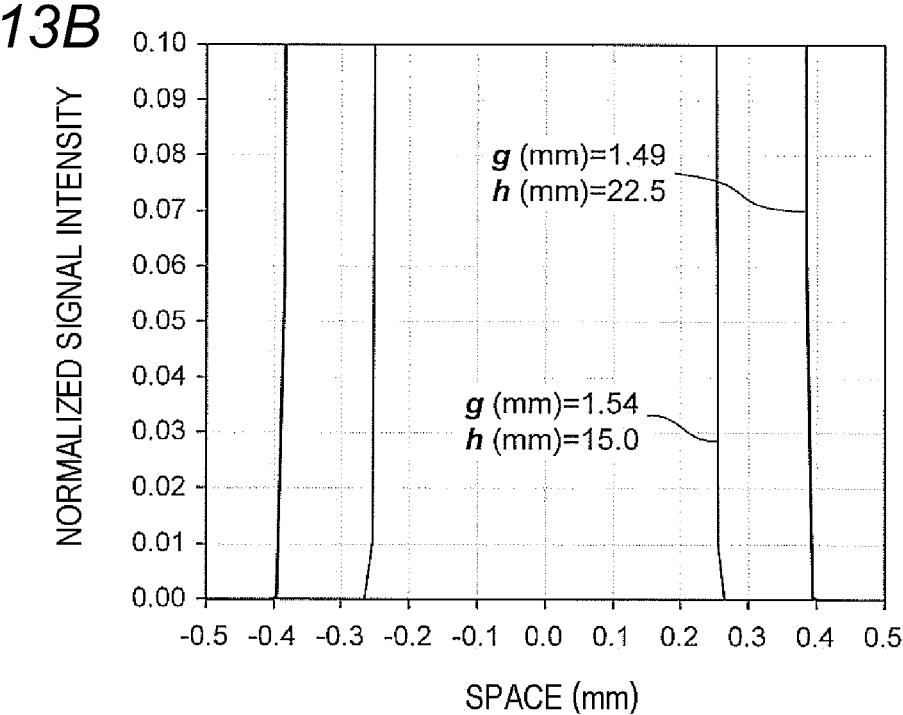

FIG. 13 illustrates the normalized signal-intensity distribution at g=1.49 mm and h=22.5 mm in FIG. 12A and the normalized signal intensity distribution at g=1.54 mm and h=15.0 mm in FIG. 12B, respectively, with respect to the maximum intensity for comparison. In FIG. 13A, the scale of the vertical axis is 0.00 to 1.00. Whereas, in FIG. 13B, the scale of the vertical axis is 0.00 to 0.10, that is, the vertical axis of FIG. 13A is enlarged.

As described above and as illustrated in FIG. 13, spot size W is the width of the region with the signal intensity of 1% or more of the maximum signal intensity, that is, the normalized signal intensity of 0.01 or more. When g=1.49 mm and h=22.5 mm, the spot size is W=0.79 mm, and when g=1.54 mm and h=15.0 mm, the spot size is W=0.52 mm. When spot size W is large, different spots generated by a dichroic-mirror array are mixed on a sensor, which causes crosstalk between different light-emission points and a decrease in spectral accuracy in multicolor detection occurs. For example, spot A with the signal-intensity distribution illustrated in FIG. 13 is measured at the center position of the spot A, that is, the position where the horizontal axis coordinate is zero. Then, it is assumed that the center of spot B derived from the adjacent light-emission point is located at 0.52 mm/2=0.26 mm, and the spot B is measured at the center position of the spot B. Under this assumption, when g=1.54 mm and h=15.0 mm, a signal having a 1% intensity of the maximum intensity of the spot A is mixed in the measured signal of the spot B. If the maximum intensity of the spot A and the maximum intensity of the spot B are equal, this corresponds to 1% crosstalk. On the other hand, when g=1.49 mm and h=22.5 mm, a signal with an intensity of 100% of the maximum intensity of the spot A, that is, a signal with an intensity equal to the maximum intensity of the spot A is mixed in the measured signal of the spot B. This corresponds to 100% crosstalk. From the above, it can be seen that as spot size W increases, crosstalk between different light-emission points may increase steeply. Therefore, reducing the maximum optical-path length by the dichroic mirror array of this embodiment and thereby reducing spot size W has a great effect on reducing crosstalk or improving the spectral accuracy in multicolor detection.

Next, specific designs of the components of the dichroic-mirror array according to the example 5 will be described. Here, it is assumed a case where four capillaries are collectively irradiated with a laser beam of 505 nm using the same capillary-array DNA sequencer as in the example 4, and nine-color detection of fluorescence emitted from the inside of each capillary is performed using the dichroic-mirror array according to the example 5.

A basic design is aimed to make the split lights C1 to C9 coming out of the dichroic-mirror array according to the example 5 respectively and mainly have light components of the following wavelength bands, that is, to transmit lights of the following wavelength bands with respect to the incident light C0.

C1: Wavelength band 520 to 540 nm
C2: Wavelength band 540 to 560 nm
C3: Wavelength band 560 to 580 nm
C4: Wavelength band 580 to 600 nm
C5: Wavelength band 600 to 620 nm
C6: Wavelength band 620 to 640 nm
C7: Wavelength band 640 to 660 nm
C8: Wavelength band 660 to 680 nm
C9: Wavelength band 680 to 700 nm That is, a light of a wavelength band of 520 to 700 nm is equally split into lights with nine-wavelength bands of a width of 20 nm and an interval of 20 nm. Obtaining such nine splits is equivalent to obtaining a wavelength dispersion spectrum with a resolution of 20 nm. Hereinafter, how to realize the above basic design will be described.

First, the bandpass filter BP transmits light of a wavelength band of 520 to 700 nm and does not transmit light of other wavelengths. In particular, the transmittance of light with a wavelength of 505 nm, i.e., the laser beam wavelength, is minimized to the utmost. Next, the dichroic mirror M1 reflects light of a wavelength band of 520 to 600 nm and transmits light of a wavelength band of 600 to 700 nm. The dichroic mirrors M2 to M5 equally split the light of the wavelength band of 520 to 600 nm into four lights with four wavelength bands of a width of 20 nm and an interval of 20 nm. That is, the dichroic mirror M2 reflects light of a wavelength band of 520 to 540 nm and transmits light of a wavelength band of 540 to 600 nm. The dichroic mirror M3 reflects light of a wavelength band of 540 to 560 nm and transmits light of a wavelength band of 560 to 600 nm. The dichroic mirror M4 reflects light of a wavelength band of 560 to 580 nm and transmits light of a wavelength band of 580 to 600 nm. The dichroic mirror M5 reflects light of a wavelength band of 580 to 600 nm.

On the other hand, the dichroic mirrors M6 to M10 equally split the light of the wavelength band of 600 to 700 nm into five lights with five wavelength bands of a width of 20 nm and an interval of 20 nm. That is, the dichroic mirror M6 transmits light of a wavelength band of 600 to 620 nm and reflects light of a wavelength band of 620 to 700 nm. The dichroic mirror M7 reflects light of a wavelength band of 620 to 640 nm and transmits light of a wavelength band of 640 to 700 nm. The dichroic mirror M8 reflects light of a wavelength band of 640 to 660 nm and transmits light of a wavelength band of 660 to 700 nm. The dichroic mirror M9 reflects light of a wavelength band of 660 to 680 nm and transmits light of a wavelength band of 680 to 700 nm. The dichroic mirror M10 reflects light of a wavelength band of 680 to 700 nm.

FIGS. 14 to 23 illustrate the results of designing the bandpass filter BP and the dichroic mirrors M1 to M9 based on the above basic design and measuring the transmission spectrum of each. Since the dichroic mirror M10 has the same spectral characteristics as the dichroic mirror M5, the illustration of the transmission spectrum is omitted.

In the transmission spectrum of each dichroic mirror except the dichroic mirror M5, a cut-on wavelength $\lambda C$ located on the left shoulder of the main transmission band (the region where the transmittance increases with respect to the wavelength) or a cut-off wavelength $\lambda C$ located on the right shoulder of the main transmission band (the region where the transmittance decreases with respect to the wavelength) is illustrated. If there are multiple cut-on wavelengths $\lambda C$ or cut-off wavelengths $\lambda C$, one of them is selected. Here, the cut-on wavelength $\lambda C$ or the cut-off wavelength $\lambda C$ at which the transmittance is 50% and changes more steeply with respect to the wavelength is selected.

Figure 14:
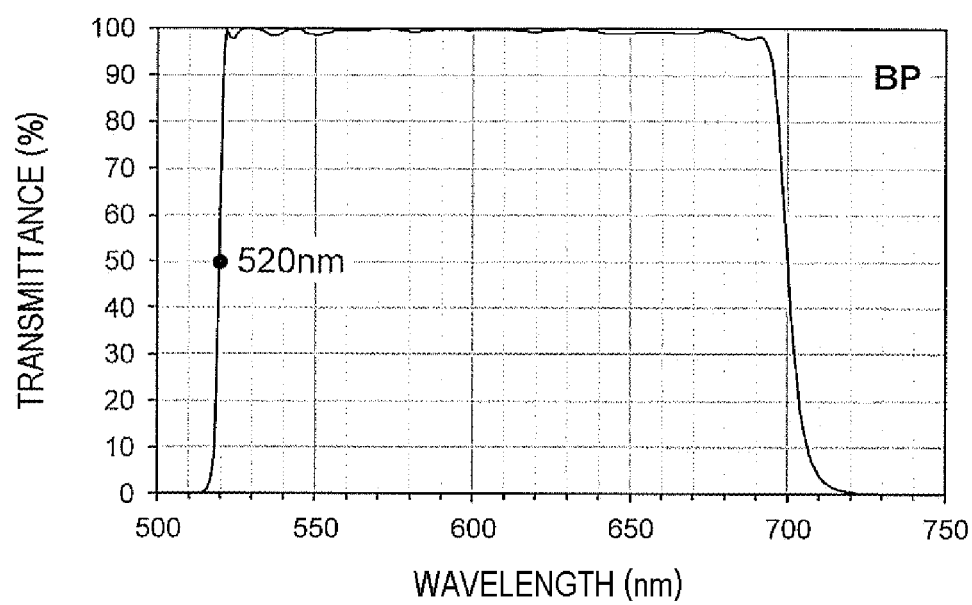
FIG. 14 is a transmission spectrum of a bandpass filter BP according to the example 5.

FIG. 14 is a transmission spectrum of the bandpass filter BP at an incident angle of 0°. The bandpass filter BP transmits light of the wavelength band of 520 to 700 nm. The cut-on wavelength of the bandpass filter BP is $\lambda C(BP)=520$ nm, which can strongly block light of a laser beam wavelength of 505 nm.

Figure 15:
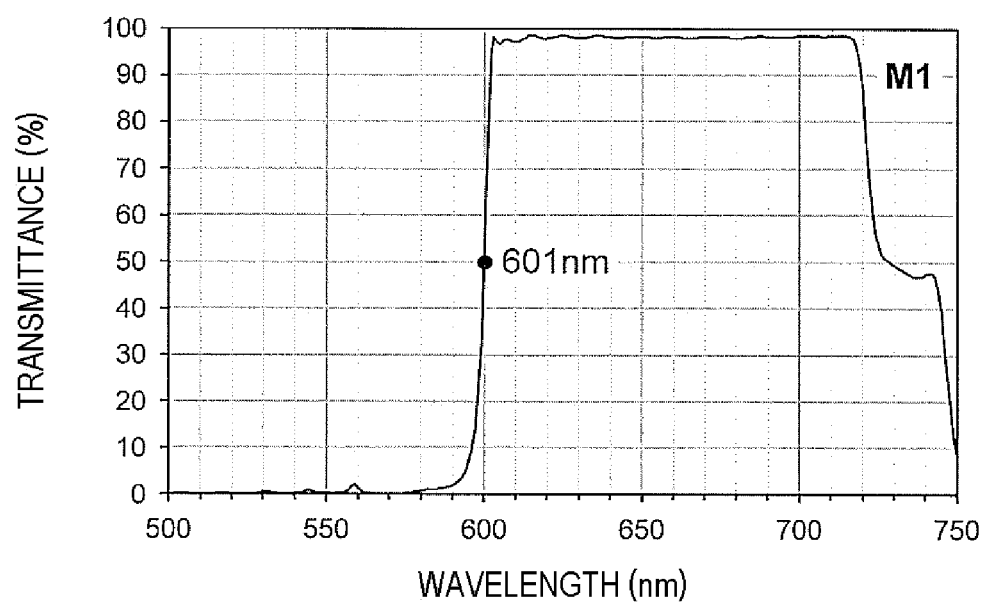
FIG. 15 is a transmission spectrum of a dichroic mirror M1 according to the example 5.

FIG. 15 is a transmission spectrum of the dichroic mirror M1 at an incident angle of 45°. The dichroic mirror M1 reflects light of the wavelength band of 520 to 600 nm and transmits light of the wavelength band of 600 to 700 nm. The cut-on wavelength of the dichroic mirror M1 is $\lambda C(M1)=601$ nm.

Figure 16:
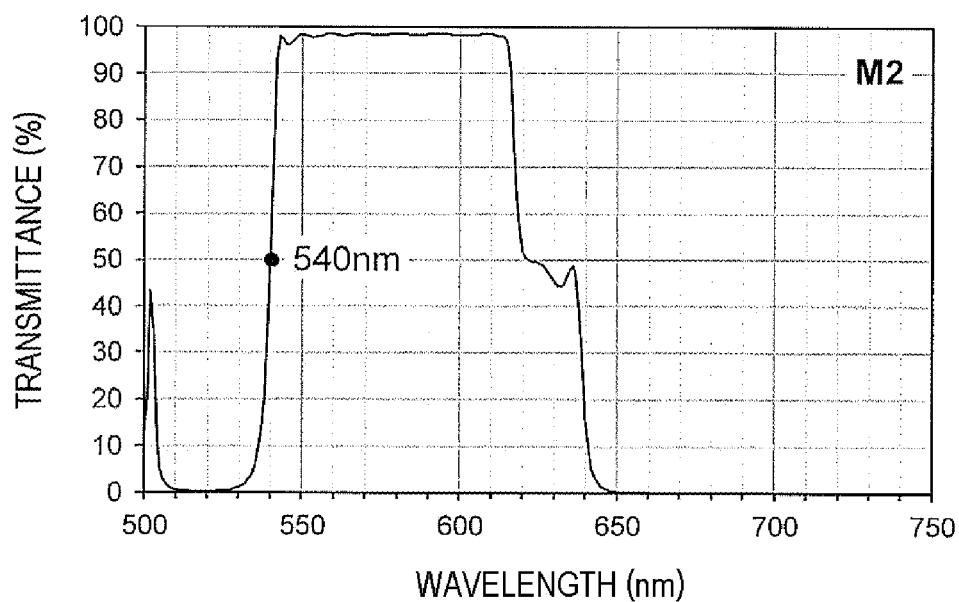
FIG. 16 is a transmission spectrum of a dichroic mirror M2 according to the example 5.

FIG. 16 is a transmission spectrum of the dichroic mirror M2 at an incident angle of 45°. The dichroic mirror M2 reflects light of the wavelength band of 520 to 540 nm and transmits light of the wavelength band of 540 to 600 nm. The cut-on wavelength of the dichroic mirror M2 is $\lambda C(M2)=540$ nm. Another transmission band different from the above main transmission band exists at wavelengths of 520 nm or less, but there is no problem as long as the above performance is satisfied.

Figure 17:
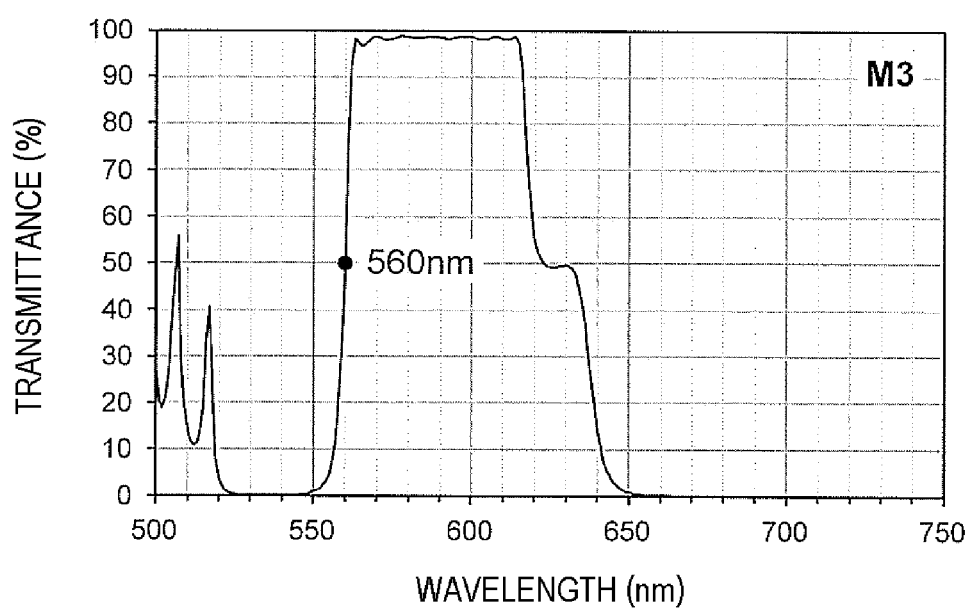
FIG. 17 is a transmission spectrum of a dichroic mirror M3 according to the example 5.

FIG. 17 is a transmission spectrum of the dichroic mirror M3 at an incident angle of 45°. The dichroic mirror M3 reflects light of the wavelength band of 540 to 560 nm and transmits light of a wavelength band of 560 to 600 nm. The cut-on wavelength of the dichroic mirror M3 is $\lambda C(M3)=560$ nm. Another transmission band different from the above main transmission band exists at wavelengths of 540 nm or less, but there is no problem as long as the above performance is satisfied.

Figure 18:
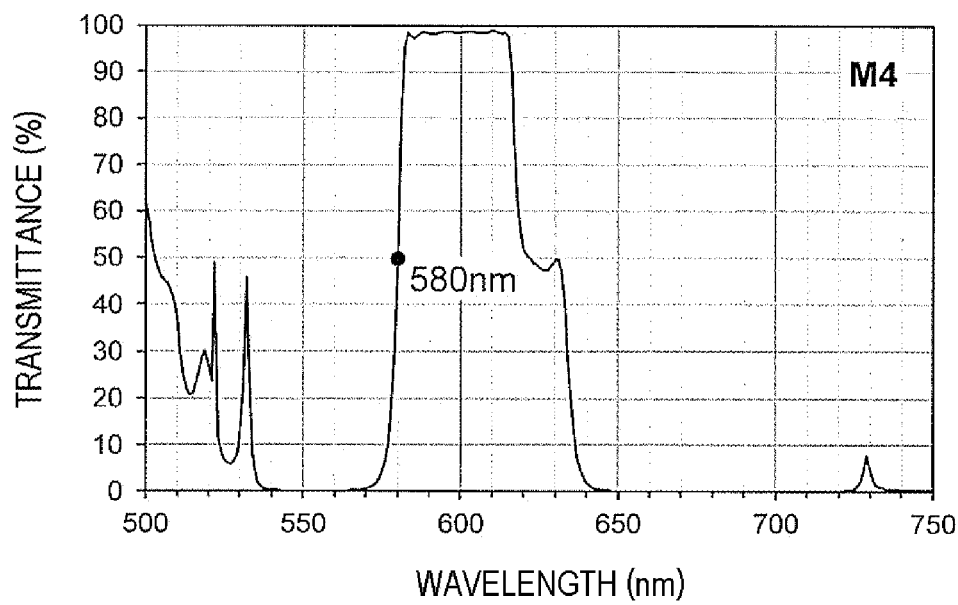
FIG. 18 is a transmission spectrum of a dichroic mirror M4 according to the example 5.

FIG. 18 is a transmission spectrum of the dichroic mirror M4 at an incident angle of 45°. The dichroic mirror M4 reflects light of the wavelength band of 560 to 580 nm and transmits light of a wavelength band of 580 to 600 nm. The cut-on wavelength of the dichroic mirror M4 is $\lambda C(M4)=580$ nm. Another transmission band different from the above main transmission band exists at wavelengths of 560 nm or less, but there is no problem as long as the above performance is satisfied.

Figure 19:
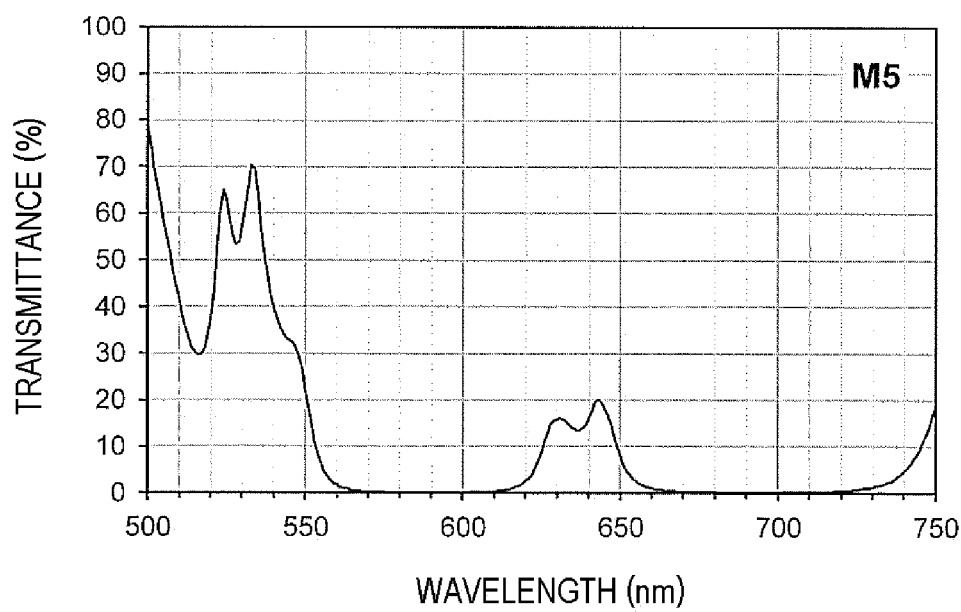
FIG. 19 is a transmission spectrum of a dichroic mirror M5 according to the example 5.

FIG. 19 is a transmission spectrum of the dichroic mirror M5 at an incident angle of 45°. The dichroic mirror M5 reflects light of the wavelength band of 580 to 600 nm, and at the same time reflects light of the wavelength band of 680 to 700 nm.

Figure 20:
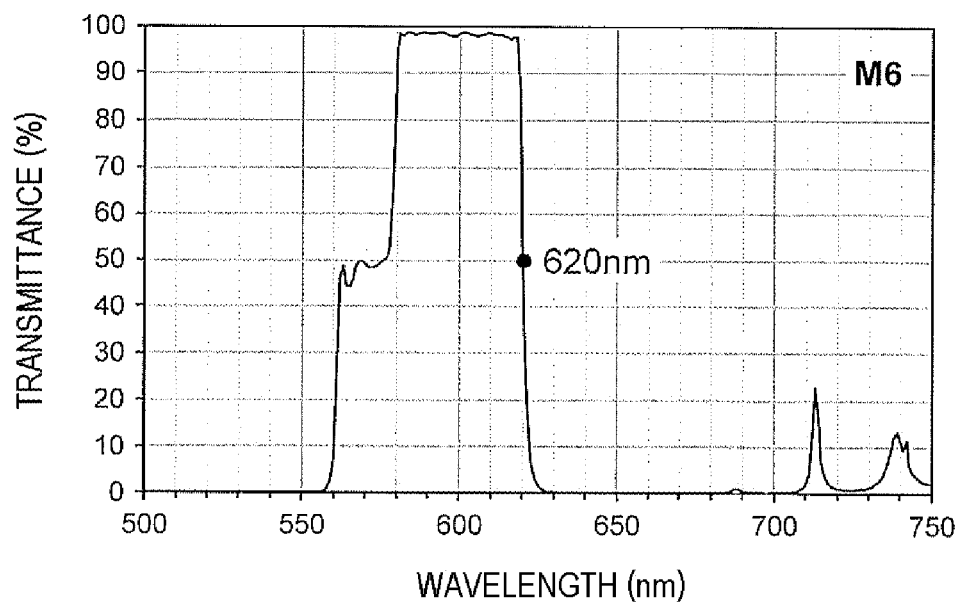
FIG. 20 is a transmission spectrum of a dichroic mirror M6 according to the example 5.

FIG. 20 is a transmission spectrum of the dichroic mirror M6 at an incident angle of 45°. The dichroic mirror M6 transmits light of the wavelength band of 600 to 620 nm and reflects light of the wavelength band of 620 to 700 nm. The cut-off wavelength of the dichroic mirror M6 is λC(M6)=620 nm. Another transmission band different from the above main transmission band exists at wavelengths of 700 nm or more, but there is no problem as long as the above performance is satisfied.

Figure 21:
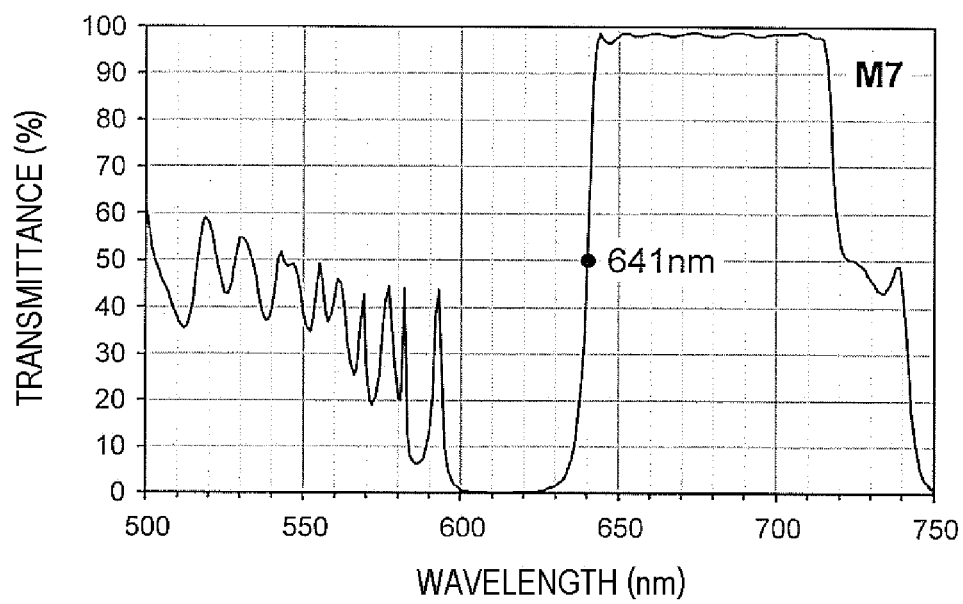
FIG. 21 is a transmission spectrum of a dichroic mirror M7 according to the example 5.

FIG. 21 is a transmission spectrum of the dichroic mirror M7 at an incident angle of 45°. The dichroic mirror M7 reflects light of the wavelength band of 620 to 640 nm and transmits light of the wavelength band of 640 to 700 nm. The cut-on wavelength of the dichroic mirror M7 is λC(M7)=641 nm. Another transmission band different from the above main transmission band exists at wavelengths of 620 nm or less, but there is no problem as long as the above performance is satisfied.

Figure 22:
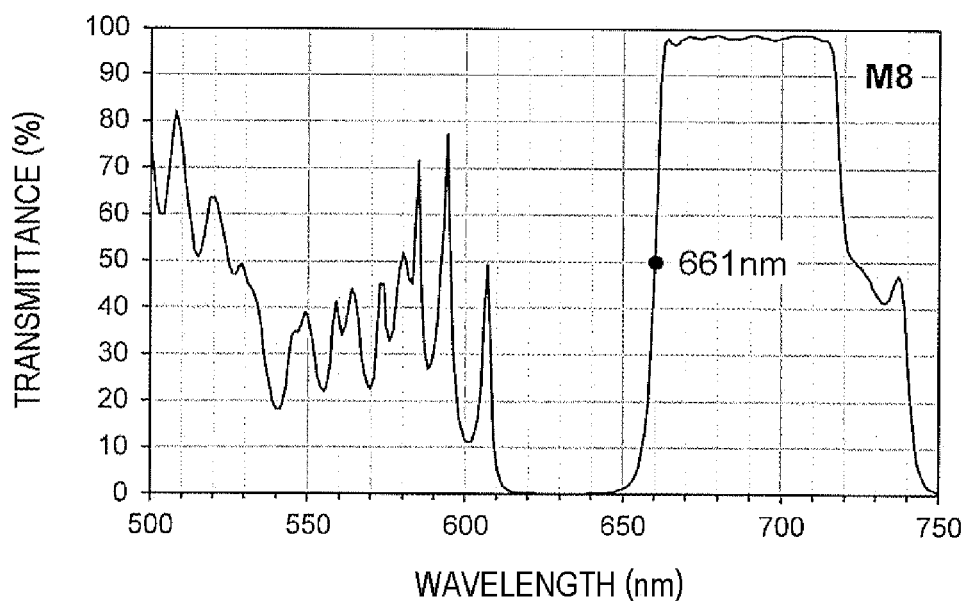
FIG. 22 is a transmission spectrum of a dichroic mirror M8 according to the example 5.

FIG. 22 is a transmission spectrum of the dichroic mirror M8 at an incident angle of 45°. The dichroic mirror M8 reflects light of the wavelength band of 640 to 660 nm and transmits light of the wavelength band of 660 to 700 nm. The cut-on wavelength of the dichroic mirror M8 is λC(M8)=661 nm. Another transmission band different from the above main transmission band exists at wavelengths of 640 nm or less, but there is no problem as long as the above performance is satisfied.

Figure 23:
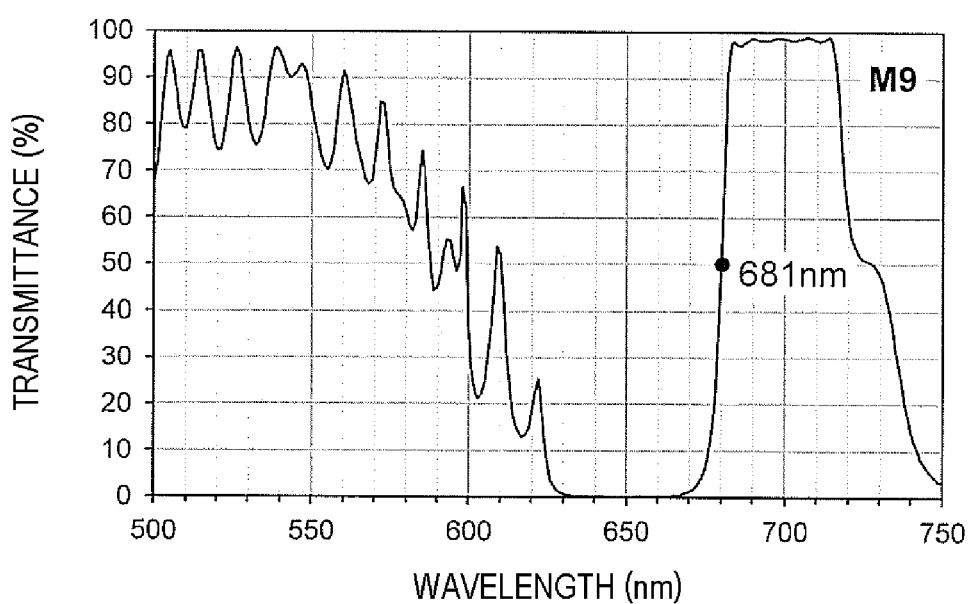
FIG. 23 is a transmission spectrum of a dichroic mirror M9 according to the example 5.

FIG. 23 is a transmission spectrum of the dichroic mirror M9 at an incident angle of 45°. The dichroic mirror M9 reflects light of the wavelength band of 660 to 680 nm and transmits light of the wavelength band of 680 to 700 nm. The cut-on wavelength of the dichroic mirror M9 is λC(M9)=681 nm. Another transmission band different from the above main transmission band exists at wavelengths of 660 nm or less, but there is no problem as long as the above performance is satisfied.

The above results indicate that it is possible to actually manufacture the dichroic-mirror array that faithfully follows the above basic design.

From the configuration of the dichroic-mirror array according to the example 5, the transmission spectra of the split lights C1 to C9 with respect to the incident light C0 are calculated as follows using the transmission spectra of the bandpass filter BP and the dichroic mirrors M1 to M9 described above. Here, transmission spectrum of any bandpass filter, dichroic mirror, and split light X is represented by [X], and reflection spectrum of X is represented by (1−[X]).

$$[C1]=[BP]\times(1-[M1])\times(1-[M2]) \quad (9)$$

$$[C2]=[BP]\times(1-[M1])\times[M2]\times(1-[M3]) \quad (10)$$

$$[C3]=[BP]\times(1-[M1])\times[M2]\times[M3]\times(1-[M4]) \quad (11)$$

$$[C4]=[BP]\times(1-[M1])\times[M2]\times[M3]\times[M4]\times(1-[M5]) \quad (12)$$

$$[C5]=[BP]\times[M1]\times[M6] \quad (13)$$

$$[C6]=[BP]\times[M1]\times(1-[M6])\times(1-[M7]) \quad (14)$$

$$[C7]=[BP]\times[M1]\times(1-[M6])\times[M7]\times(1-[M8]) \quad (15)$$

$$[C8]=[BP]\times[M1]\times(1-[M6])\times[M7]\times[M8]\times(1-[M9]) \quad (16)$$

$$[C9]=[BP]\times[M1]\times(1-[M6])\times[M7]\times[M8]\times[M9]\times(1-[M5]) \quad (17)$$

Figure 24:
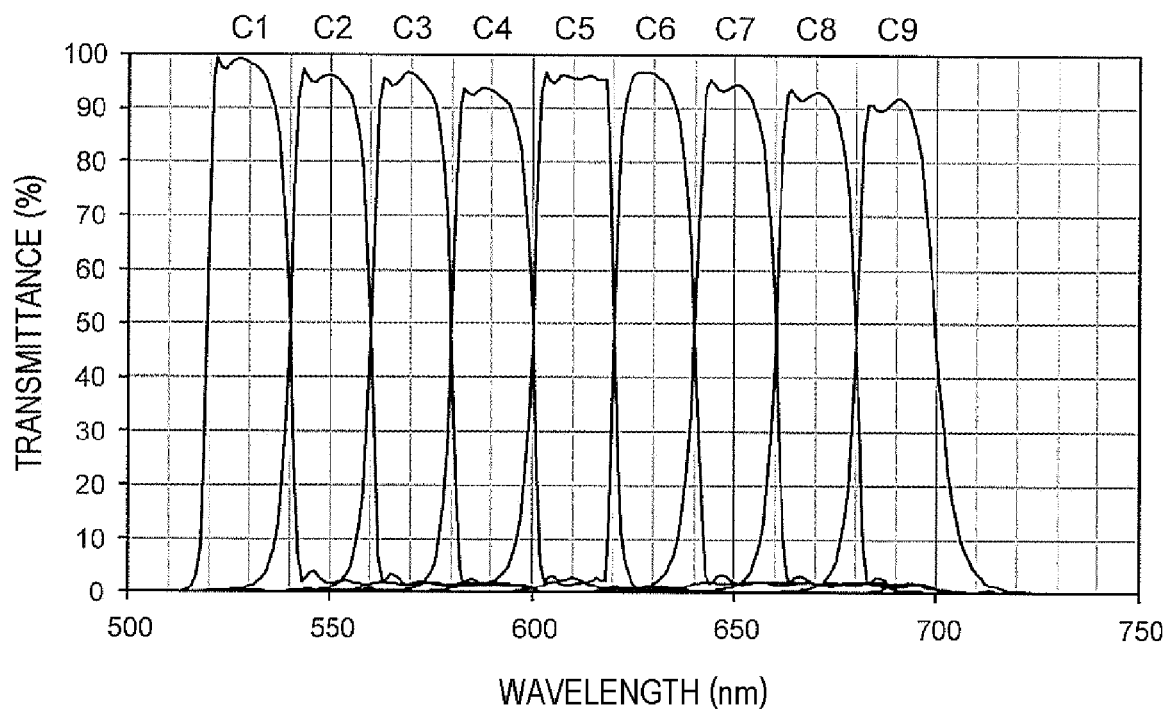
FIG. 24 is transmission spectra of split lights C1 to C9 emitted from a 9-split dichroic-mirror array according to the example 5.

FIG. 24 illustrates the transmission spectra of the split lights C1 to C9 calculated using the results of FIGS. 14 to 23 and the above equations. This result shows that it is possible to actually manufacture the dichroic-mirror array that faithfully follows the above basic design. Surprisingly, the maximum transmittance in the transmission wavelength band of each of the split lights C1 to C9 exceeds 90%. This value shows the ratio when the amount of light of the same wavelength contained in the incident light C0 is 100%. For example, assuming that the amount of light with a wavelength of 610 nm contained in the incident light C0 is 100%, the amount of light with a wavelength of 610 nm contained in the split light C5 reaches 96%. Such highly efficient spectroscopic performance cannot be obtained even by, for example, a conventional method using a diffraction grating.

In the dichroic-mirror array according to the example 5, the following Expression (18) is preferably satisfied, which simplifies the configuration of the dichroic-mirror array.

$$\lambda C(M2)<\lambda C(M3)<\lambda C(M4)<\lambda C(M1)<\lambda C(M6)<\lambda C(M7)<\lambda C(M8)<\lambda C(M9) \quad (18)$$

Generalizing the above according to FIG. 1, it is preferable to satisfy any of the following Expressions (19) to (26).

$$\lambda C(DA2)<\ldots<\lambda C(DA(m-1))<\lambda C(DA1)<\lambda C(DB1)<\ldots<\lambda C(DB(n-1)) \quad (19)$$

$$\lambda C(DA(m-1))<\ldots<\lambda C(DA2)<\lambda C(DA1)<\lambda C(DB1)<\ldots<\lambda C(DB(n-1)) \quad (20)$$

$$\lambda C(DA2)<\ldots<\lambda C(DA(m-1))<\lambda C(DA1)<\lambda C(DB(n-1))<\ldots<\lambda C(DB1) \quad (21)$$

$$\lambda C(DA(m-1))<\ldots<\lambda C(DA2)<\lambda C(DA1)<\lambda C(DB(n-1))<\ldots<\lambda C(DB1) \quad (22)$$

$$\lambda C(DB1)<\ldots<\lambda C(DB(n-1))<\lambda C(DA1)<\lambda C(DA2)<\ldots<\lambda C(DA(m-1)) \quad (23)$$

$$\lambda C(DB(n-1))<\ldots<\lambda C(DB1)<\lambda C(DA1)<\lambda C(DA2)<\ldots<\lambda C(DA(m-1)) \quad (24)$$

$$\lambda C(DB1)<\ldots<\lambda C(DB(n-1))<\lambda C(DA1)<\lambda C(DA(m-1))<\ldots<\lambda C(DA2) \quad (25)$$

$$\lambda C(DB(n-1))<\ldots<\lambda C(DB1)<\lambda C(DA1)<\lambda C(DA(m-1))<\ldots<\lambda C(DA2) \quad (26)$$

As described above, in the dichroic-mirror array according to this embodiment, when DA1 to DA(m−1) and DB1 to DB(n−1) are combined into a subgroup, each dichroic mirror in the subgroup preferably have transmission spectra different from each other at a predetermined incident angle.

Example 6

In general, intensity of a laser beam, which is an excitation light, is many orders of magnitude larger than intensity of fluorescence obtained by the excitation. Therefore, in order to perform fluorescence measurement with high sensitivity, a long-pass filter or a bandpass filter that blocks light having the wavelength of the laser beam while transmits fluorescence of a longer wavelength than the wavelength of the laser beam is used. However, for example, when two laser beams with different wavelengths are used, it is difficult to manufacture a long-pass filter or a bandpass filter that blocks two laser beams but transmits a plurality of kinds of fluorescence excited by each laser beam.

Therefore, it is conceivable to adopt a method using a notch filter that blocks only light having a specific wavelength. That is, the light of the wavelength of the laser beam with the shorter wavelength is blocked by the long-pass filter or the bandpass filter, and the light of the wavelength of the laser beam with the longer wavelength is blocked by the notch filter. This method can be used for conventional dichroic-mirror arrays, or for other conventional spectroscopic-analysis methods, for example, a method of wavelength dispersion using a diffraction grating. However, notch filters are so expensive that their use is not practical.

Therefore, in this example, the following configuration example will be described. Two laser beams are used as excitation-light sources, and 10-color detection of fluorescence emitted from fluorophores excited by each laser beam is performed by a dichroic-mirror array while blocking light of a wavelength of each laser beam. The wavelength of the laser beam is 505 nm and 635 nm.

Figure 25:
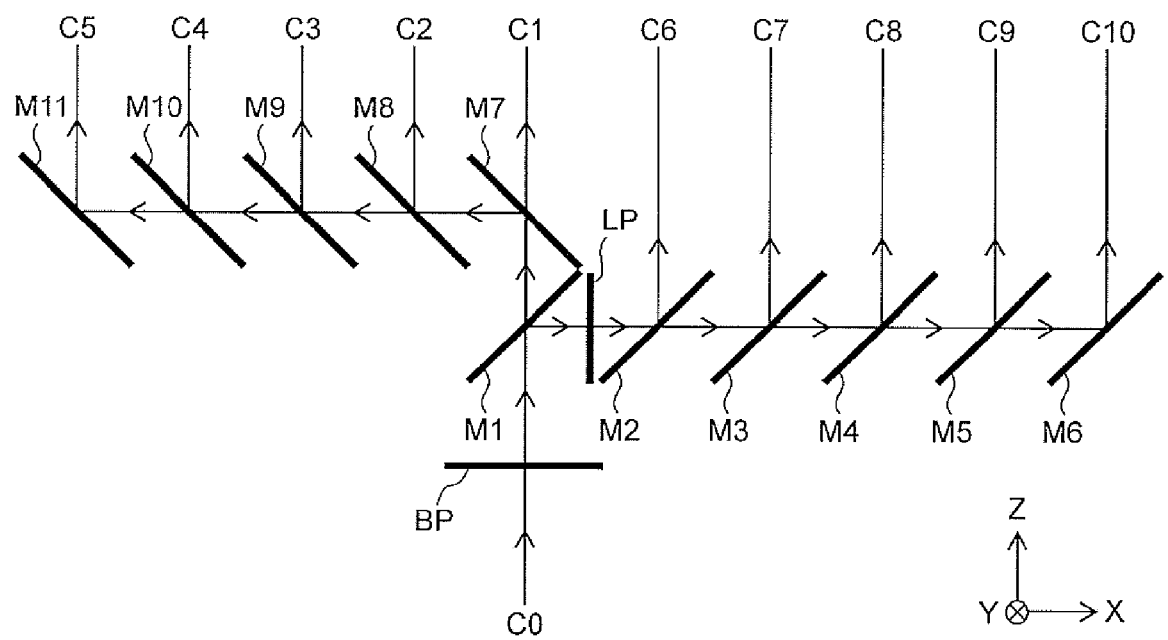
FIG. 25 is a cross-sectional view illustrating a configuration of a 10-split dichroic-mirror array according to an example 6.

FIG. 25 is a cross-sectional view illustrating the configuration of a dichroic-mirror array according to an example 6. The dichroic-mirror array of this example is mounted on the same capillary-array DNA sequencer as in the example 4. But the example 6 differs from the example 4 in that two laser beams having different wavelengths are used as excitation-light sources.

As illustrated in FIG. 25, the dichroic-mirror array according to this example includes 11 dichroic mirrors M1 to M11, a bandpass filter BP (first filter), and a long-pass filter LP (second filter), and splits the incident light C0 into 10-split lights C1 to C10. Although not illustrated, the dichroic mirrors M1 to M6 are classified into the group A, and the dichroic mirrors M7 to M11 are classified into the group B.

The bandpass filter BP is arranged parallel to the XY plane on the negative direction side of the Z axis from the dichroic mirror M1.

The long-pass filter LP is arranged parallel to the YZ plane between the dichroic mirrors M1 and M2.

A basic design of the dichroic-mirror array of this example is aimed to make the split lights C1 to C10 respectively and mainly have light components of the following wavelength bands, that is, to transmit lights of the following wavelength bands with respect to the incident light C0. Fluorescence measured by the split lights C1 to C5 is mainly emissions of fluorophores excited by a laser beam with a wavelength of 505 nm, whereas fluorescence measured by the split lights C6 to C10 is mainly emissions of fluorophores excited by a laser beam with a wavelength of 635 nm.

C1: Wavelength band 520 to 540 nm
C2: Wavelength band 540 to 560 nm
C3: Wavelength band 560 to 580 nm
C4: Wavelength band 580 to 600 nm
C5: Wavelength band 600 to 620 nm
C6: Wavelength band 650 to 670 nm
C7: Wavelength band 670 to 690 nm
C8: Wavelength band 690 to 710 nm
C9: Wavelength band 710 to 730 nm
C10: Wavelength band 730 to 750 nm Hereinafter, how to realize the above basic design will be described.

First, the bandpass filter BP transmits light of a wavelength band of 520 to 750 nm and does not transmit light of other wavelengths. In particular, the transmittance of light with a wavelength of 505 nm, i.e., the laser beam wavelength, is made as small as possible to effectively block the light. Next, the dichroic mirror M1 transmits light of a wavelength band of 520 to 620 nm and reflects light of a wavelength band of 620 to 750 nm. The dichroic mirrors M7 to M11 equally split the light of the wavelength band of 520 to 620 nm into five lights with five wavelength bands of a width of 20 nm and an interval of 20 nm. That is, the dichroic mirror M7 transmits light of a wavelength band of 520 to 540 nm and reflects light of a wavelength band of 540 to 620 nm. The dichroic mirror M8 reflects light of a wavelength band of 540 to 560 nm and transmits light of a wavelength band of 560 to 620 nm. The dichroic mirror M9 reflects light of a wavelength band of 560 to 580 nm and transmits light of a wavelength band of 580 to 620 nm. The dichroic mirror M10 reflects light of a wavelength band of 580 to 600 nm and transmits light of a wavelength band of 600 to 620 nm. The dichroic mirror M11 reflects light of a wavelength band of 600 to 620 nm.

On the other hand, the dichroic mirrors M2 to M6 equally split the light of a wavelength band of 650 to 750 nm into five lights with five wavelength bands of a width of 20 nm and an interval of 20 nm. First, the long-pass filter LP transmits light of a wavelength band of 650 to 750 nm and does not transmit light of other wavelengths. In particular, the transmittance of light with a wavelength of 635 nm, i.e., the laser beam wavelength is made as small as possible to effectively block the light. The dichroic mirror M2 reflects light of a wavelength band of 650 to 670 nm and transmits light of a wavelength band of 670 to 750 nm. The dichroic mirror M3 reflects light of a wavelength band of 670 to 690 nm and transmits light of a wavelength band of 690 to 750 nm. The dichroic mirror M4 reflects light of a wavelength band of 690 to 710 nm and transmits light of a wavelength band of 710 to 750 nm. The dichroic mirror M5 reflects light of a wavelength band of 710 to 730 nm and transmits light of a wavelength band of 730 to 750 nm. The dichroic mirror M6 reflects light of a wavelength band of 730 to 750 nm.

As described above, by using multiple laser beams with different wavelengths, applications can be expanded by exciting more kinds of fluorophores, and excitation efficiency of various fluorophores can be increased to detect fluorescence with high sensitivity.

Example 7

Next, an example of applying a dichroic-mirror array of the present disclosure to an analyzer that condenses light with a lens, irradiates a reaction cell with the condensed light, and spectroscopically analyzes the transmitted light through the reaction cell will be described. An example of such an analyzer is an automatic biochemical analyzer. The automatic biochemical analyzer uses body fluid components such as blood and urine as samples, and measures various components such as sugar, cholesterol, protein, and enzyme. Since light absorption spectrum and the absorbance change as reagents react with the various components contained in the samples in the reaction cell, the various components can be quantified by measuring them.

The conventional biochemical analyzer adopts a method in which wavelength dispersion of halogen lamp light transmitted through the reaction cell is measured by a diffraction grating and light intensities of 12 kinds of wavelengths, that is, light intensities of wavelengths 340 nm, 405 nm, 450 nm, 480 nm, 505 nm, 546 nm, 570 nm, 600 nm, 660 nm, 700 nm, 750 nm, and 800 nm are detected by photodiodes, respectively.

Figure 26:
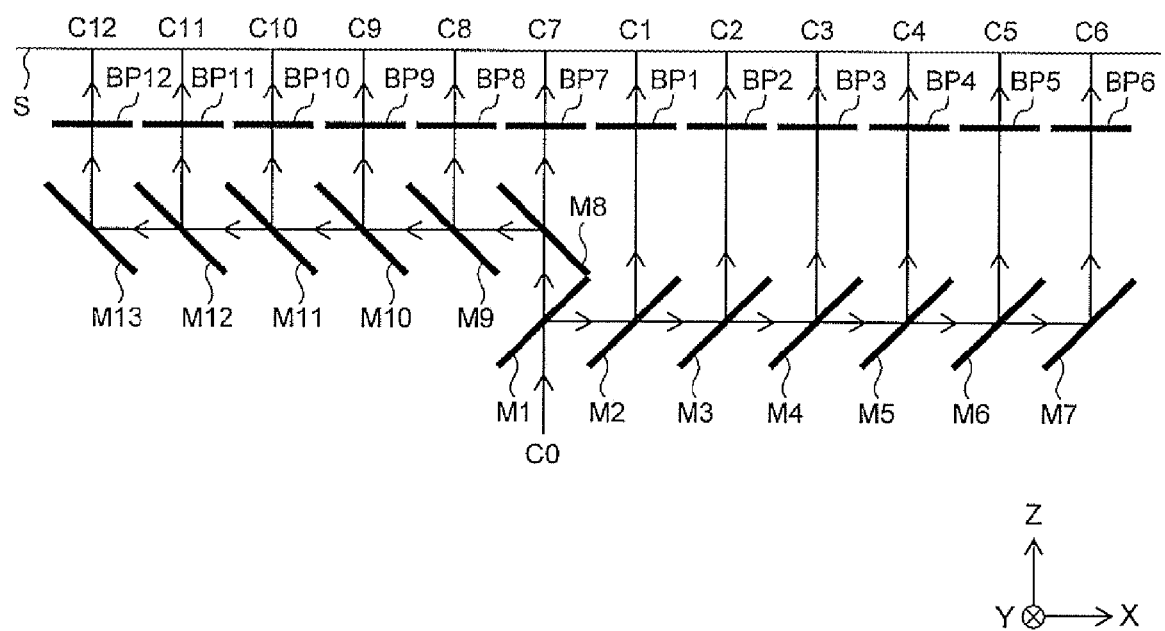
FIG. 26 is a cross-sectional view illustrating a configuration of a 12-split dichroic-mirror array according to an example 7.

FIG. 26 is a cross-sectional view illustrating the configuration of the dichroic mirror array according to an example 7. The dichroic mirror array of this example can be applied to, for example, the above automatic biochemical analyzer.

As illustrated in FIG. 26, the dichroic-mirror array of this example includes 13 dichroic mirrors M1 to M13 and 12 bandpass filters BP1 to BP12 (third filters), and splits the incident light C0 into 12-split lights C1 to C12. The split lights C1 to C12 exited from the dichroic-mirror array respectively enter the sensor surface S of the sensor. Although not illustrated, the dichroic mirrors M1 to M7 are classified into the group A, and the dichroic mirrors M8 to M13 are classified into the group B.

A basic design of the dichroic-mirror array of this example is aimed to make the split lights C1 to C12 have light components with central wavelengths of 340 nm, 405 nm, 450 nm, 480 nm, 505 nm, 546 nm, 570 nm, 600 nm, 660 nm, 700 nm, 750 nm, and 800 nm with respect to the incident light C0.

Hereinafter, how to realize the above basic design will be described.

First, the dichroic mirror M1 reflects light of a wavelength band of 300 to 560 nm and transmits light of a wavelength band of 560 to 900 nm. The dichroic mirror M2 reflects light of a wavelength band of 300 to 380 nm and transmits light of a wavelength band of 380 to 560 nm. The bandpass filter BP1 transmits light of 335 to 345 nm. The dichroic mirror M3 reflects light of a wavelength band of 380 to 430 nm and transmits light of a wavelength band of 430 to 560 nm. The bandpass filter BP2 transmits light of 400 to 410 nm. The dichroic mirror M4 reflects light of a wavelength band of 430 to 470 nm and transmits light of a wavelength band of 470 to 560 nm. The bandpass filter BP3 transmits light of 445 to 455 nm. The dichroic mirror M5 reflects light of a wavelength band of 470 to 490 nm and transmits light of a wavelength band of 490 to 560 nm. The bandpass filter BP4 transmits light of 475 to 485 nm. The dichroic mirror M6 reflects light of a wavelength band of 490 to 530 nm and transmits light of a wavelength band of 530 to 560 nm. The bandpass filter BP5 transmits light of 500 to 510 nm. The dichroic mirror M7 reflects light of a wavelength band of 530 to 560 nm. The bandpass filter BP6 transmits light of 541 to 551 nm.

On the other hand, the dichroic mirror M8 transmits light of a wavelength band of 560 to 590 nm and reflects light of a wavelength band of 590 to 900 nm. The bandpass filter BP7 transmits light of 565 to 575 nm. The dichroic mirror M9 reflects light of a wavelength band of 590 to 630 nm and transmits light of a wavelength band of 630 to 900 nm. The bandpass filter BP8 transmits light of 595 to 605 nm. The dichroic mirror M10 reflects light of a wavelength band of 630 to 680 nm and transmits light of a wavelength band of 680 to 900 nm. The bandpass filter BP9 transmits light of 655 to 665 nm. The dichroic mirror M11 reflects light of a wavelength band of 680 to 730 nm and transmits light of a wavelength band of 730 to 900 nm. The bandpass filter BP10 transmits light of 695 to 705 nm. The dichroic mirror M12 reflects light of a wavelength band of 730 to 780 nm and transmits light of a wavelength band of 780 to 900 nm. The bandpass filter BP11 transmits light of 745 to 755 nm. The dichroic mirror M13 reflects light of a wavelength band of 780 to 900 nm. The bandpass filter BP12 transmits light of 795 to 805 nm.

As described above, it is possible to reduce the size of the automatic biochemical analyzer, improve the light utilization efficiency, and improve the sensitivity by replacing the conventional spectroscopic analysis method with the method of the present disclosure.

2. Second Embodiment

Next, a dichroic-mirror array according to a second embodiment will be described with reference to FIG. 27. The dichroic-mirror array according to this embodiment is different from the dichroic-mirror arrays in the first embodiment in that it has three or more groups of dichroic mirrors.

Figure 27A:
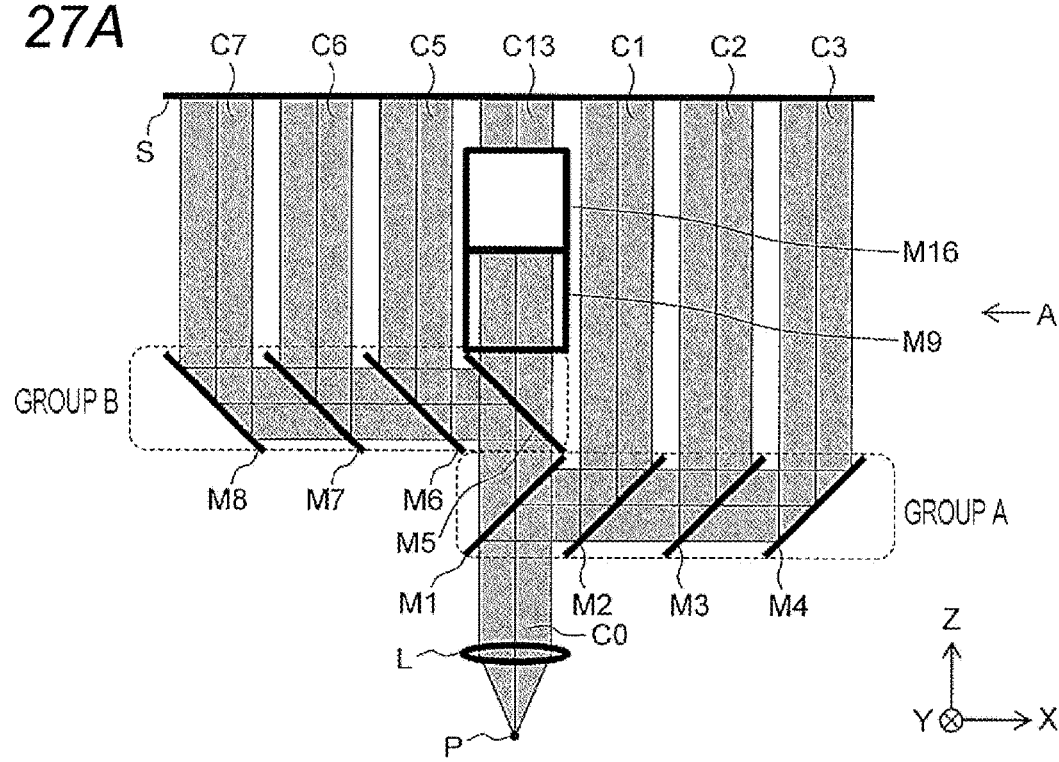
FIGS. 27A and 27B are a schematic diagram illustrating a configuration of a multicolor analyzer including a 13-split dichroic-mirror array according to a second embodiment.
Figure 27B:
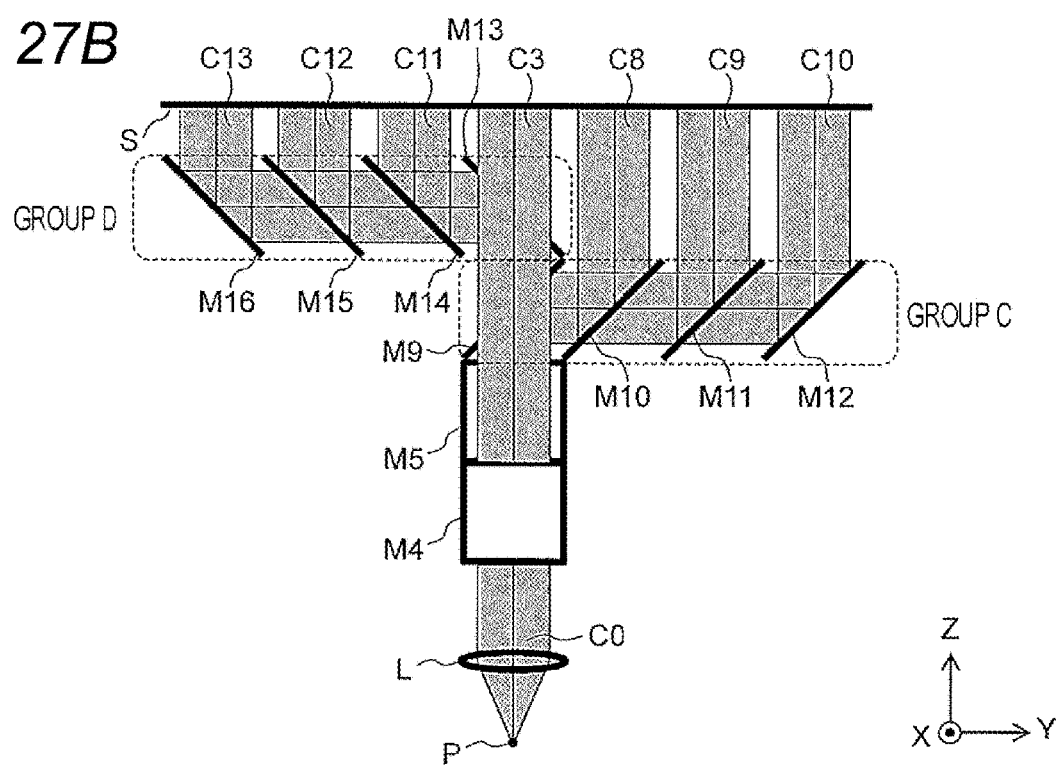

FIG. 27 is a schematic diagram illustrating the configuration of a multicolor detector including the 13-split dichroic-mirror array according to the second embodiment. FIG. 27A is a cross-sectional view of the multicolor detector on the XZ plane. FIG. 27B is a view taken along arrow A of FIG. 27A.

In the example illustrated in FIG. 27, the dichroic-mirror array includes dichroic mirrors M1 to M4 of a group A, dichroic mirrors M5 to M8 of a group B, dichroic mirrors M9 to M12 of a group C (third group), and dichroic mirrors M13 to M16 of a group D, and splits the incident light C0 into 13 lights to obtain 13-split lights C1 to C13.

The groups A to D are arranged in this order along the positive direction of the Z axis, and the dichroic mirrors M1, M5, M9, and M13 are all arranged on the Z axis. The dichroic mirrors M1 to M4 are arranged along the positive direction of the X axis. The dichroic mirrors M5 to M8 are arranged along the negative direction of the X axis. The dichroic mirrors M9 to M12 are arranged along the positive direction of the Y axis. The dichroic mirrors M13 to M16 are arranged along the negative direction of the Y axis.

As described above, the dichroic-mirror array according to this embodiment has four groups of dichroic mirrors and has a four-layer structure. With the above configuration, the incident light C0 is split into 13 lights C1 to C13.

As illustrated in FIG. 27, the multicolor detector includes a condensing lens L, an area sensor, and a light-emission point P. The split lights C1 to C13 travel in the positive direction of the Z axis, are vertically incident on the sensor surface S of the area sensor, and are detected at the same time.

Since the split lights C1 to C13 are components of different wavelength bands of the incident light C0, that is, components of different colors, it is possible to perform 13-color detection of the incident light C0 by measuring the split lights C1 to C13 simultaneously and independently. In the case of the multicolor detector illustrated in FIG. 27, when the maximum optical-path length and the optical-path-length difference are evaluated using the unit in the same manner as described above, the maximum optical-path length is 7 and the optical-path-length difference is 3. Therefore, it can be seen that by adopting the structure of the dichroic-mirror array illustrated in FIG. 27, the maximum optical-path length and the optical-path-length difference are further reduced as compared with the first embodiment and FIG. 3.

The number of groups of dichroic mirrors is not limited to four, and can be any number. In this case, the dichroic mirrors located at the ends of each group are arranged at different positions on the Z axis, and the dichroic mirrors belonging to each group are arranged at different positions on the XY plane.

In this embodiment, when the number of groups of dichroic mirrors is generalized, the number of split lights is {total number of dichroic mirrors−(number of groups−1)}. On the other hand, in the conventional dichroic-mirror array, the number of split lights is equal to the total number of dichroic mirrors.

3. Third Embodiment

In the first and second embodiments, it has been assumed that the thickness of each dichroic mirror is negligibly small compared to the width of each dichroic mirror, the arrangement spacing, and the like, and each dichroic mirror is arranged horizontally. However, in reality, as the dichroic-mirror array is smaller, the influence of the thickness may not be negligible. Therefore, in this embodiment, a configuration in which the dichroic mirrors are arranged in a stepwise manner is adopted in accordance with PTL 3.

Comparative Example 3

Figure 28:
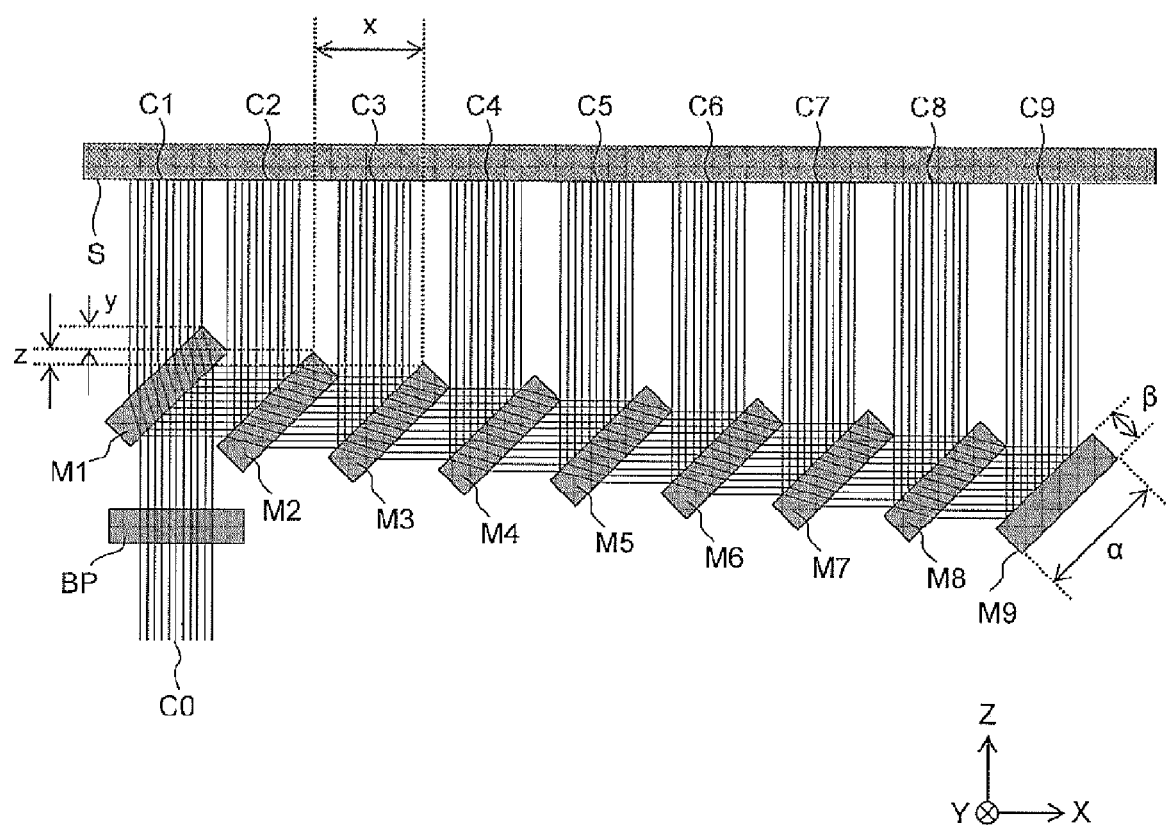
FIG. 28 is a schematic diagram illustrating a configuration of a 9-split dichroic-mirror array according to a comparative example 3.

A comparative example of the third embodiment will be described. FIG. 28 is a schematic diagram illustrating the configuration of a dichroic-mirror array according to a comparative example 3.

The dichroic-mirror array according to the comparative example 3 includes dichroic mirrors M1 to M9 and a bandpass filter BP.

The dichroic mirrors M1 to M9 with nine different spectral characteristics are arranged in the X-axis direction, but the positions in the Z-axis direction are shifted in this order in the negative direction of the Z axis. As illustrated in FIG. 28, the incident light and the transmitted light of each of the dichroic mirrors M1 to M9 are parallel to each other but the central axes of the incident light and the transmitted light are shifted from each other due to the internal refraction of the dichroic mirrors M1 to M9, that is, according to the thicknesses of the dichroic mirrors M1 to M9. Therefore, by arranging the dichroic mirrors in a stepwise manner as illustrated in FIG. 28, the wider incident light C0 can be split into nine lights, that is, the aperture width can be expanded.

In the comparative example 3, the incident light and the split lights are drawn by light fluxes having a realistic width. The light fluxes are represented by 11 infinitely narrow rays arranged at approximately equal intervals. Each ray depicted in FIG. 28 is obtained by a ray-tracing calculation according to the laws of reflection and refraction.

The average of the arrangement spacing of the dichroic mirrors M1 to M9 in the X-axis direction is x, the step between the dichroic mirrors M1 and M2 in the Z-axis direction is y, and the average of the step between the dichroic mirror Mk ($2 \leq k \leq 8$) and the dichroic mirror M(k+1) in the Z-axis direction is z.

The width and the thickness of the dichroic mirrors M1 to M9 are $\alpha$ and $\beta$, respectively. Here, the width $\alpha$ is defined as the width of the dichroic mirrors M1 to M9 parallel to the XZ plane and perpendicular to the normal vectors. The thickness $\beta$ is defined as the width parallel to the normal vectors of the dichroic mirrors M1 to M9.

The incident angle of the light flux on the incident surface of the dichroic mirror M1 is $\theta_0$, and the refraction angle on the incident surface is $\theta_1$. Further, the incident angle of the light fluxes on the incident surfaces of the dichroic mirrors M2 to M9 is $(90°-\theta_0)$, and the refraction angle of the light flux on each incident surface is $\theta_2$.

The bandpass filter BP is arranged parallel to the XY plane on the negative direction side of the Z axis from the dichroic mirror M1.

The area sensor is arranged parallel to the XY plane on the positive direction side of the Z axis from the dichroic mirrors M1 to M9. The split lights C1 to C9 are vertically incident on the sensor surface S of the area sensor.

In the comparative example 3, the incident light C0 traveling in the positive direction of the z axis is incident on the bandpass filter BP at an incident angle of 0° and produce a transmitted light traveling in the positive direction of the Z axis. The transmitted light through the bandpass filter BP is incident on the dichroic mirror M1 at an incident angle of 45° and is split into a reflected light traveling in the positive direction of the X axis and a transmitted light in the positive direction of the Z axis, that is, a split light C1. The reflected light by the dichroic mirror M1 is incident on the dichroic mirror M2 at an incident angle of 45° and is split into a transmitted light traveling in the positive direction of the X axis and a reflected light traveling in the positive direction of the Z axis, that is, a split light C2. Similarly, the transmitted light through the dichroic mirror Mk ($2 \leq k \leq 8$) is incident on the dichroic mirror M(k+1), and split into a transmitted light traveling in the positive direction of the X axis and a reflected light traveling in the positive direction of the Z axis, that is, a split light C(k+1).

Here, in the comparative example 3, the dichroic mirrors M1 to M9 has the width $\alpha$=3.4 mm and the thickness $\beta$=1.0 mm. The angle formed by the incident light on each of the dichroic mirrors M1 to M9 and each of the above normal lines is $\theta_0$=45°. The base material of the dichroic mirrors M1 to M9 is quartz glass, and its refractive index is $n_0$=1.46.

Under this condition, PTL 3 derives the best mode condition in which the maximum optical-path length is the shortest and the aperture width is the widest. In FIG. 28, the arrangement is made to satisfy the best mode condition, that is, the following Expressions (27) to (29) are satisfied. The aperture width V is given by the following Expression (30).

$$x = x_0 = \cos\theta_0 * \alpha + \sin\theta_0 * \beta = 3.1 \text{ mm} \quad (27)$$

$$y = y_0 = \cos\theta_0 * \beta = 0.71 \text{ mm} \quad (28)$$

$$z = z_0 = \sin(90 - \theta_0 - \theta_2)/\cos\theta_2 * \beta = 0.32 \text{ mm} \quad (29)$$

$$V = V_0 = a_V * \alpha + b_V * \beta = 2.0 \text{ mm} \quad (30)$$

Here, $a_V$ and $b_V$ satisfy the following Expressions (31) and (32), respectively.

$$a_V = \cos\theta_0 \quad (31)$$

$$b_V = -\cos\theta_0 * \tan\theta_1 \quad (32)$$

$\theta_1$ and $\theta_2$ are given by the following Expressions (33) and (34).

$$\theta_1 = \sin^{-1}(1/n_0 * \sin\theta_0) \quad (33)$$

$$\theta_2 = \sin^{-1}(1/n_0 * \sin(90° - \theta_0)) \quad (34)$$

In this condition, the step between the dichroic mirrors M1 and M9 is as large as 2.9 mm. That is, the maximum optical-path length is 2.9 mm longer than that in the case of horizontal arrangement in which there is no step between dichroic mirrors in the Z-axis direction.

Example 8

Figure 29:
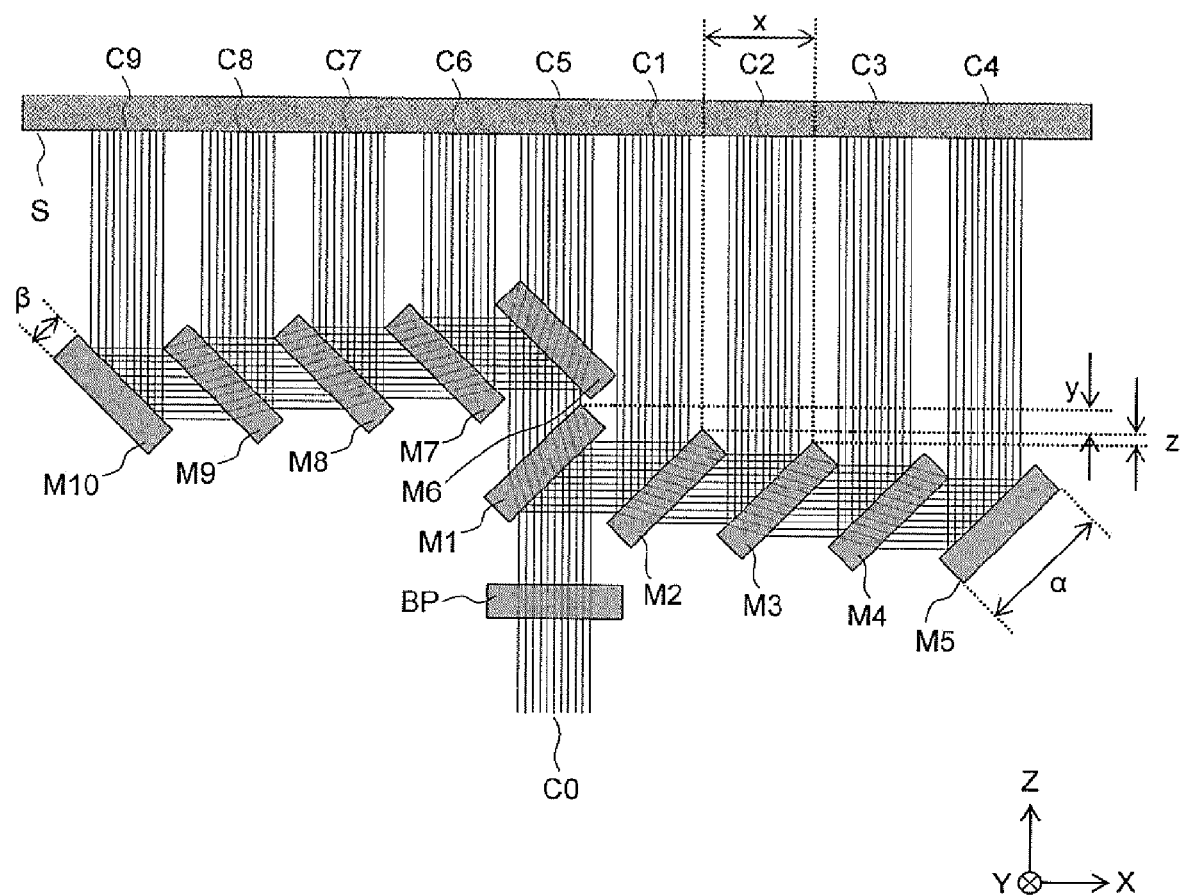
FIG. 29 is a schematic diagram illustrating a configuration of a 9-split dichroic-mirror array according to an example 8.

An example of the third embodiment will be described. FIG. 29 is a schematic diagram illustrating a configuration of a dichroic-mirror array according to an example 8.

The dichroic-mirror array according to the example 8 has the same components as the dichroic-mirror array of the example 5, but is different from the dichroic-mirror array of the example 5 in that the positions of the dichroic mirrors M1 to M5 in the Z-axis direction are shifted in this order in the negative direction of the Z axis, and the positions of dichroic mirrors M6 to M10 in the Z-axis direction are also shifted in this order in the negative direction of the Z axis.

Similar to the comparative example 3, the average of the arrangement spacing of the dichroic mirrors M1 to M5 in the X-axis direction and the arrangement spacing of the dichroic mirrors M6 to M10 in the X-axis direction is x, the average of the step between the dichroic mirrors M1 and M2 in the Z-axis direction and the step between the dichroic mirrors M6 and M7 in the Z-axis direction is y, and the average of the steps between the dichroic mirrors Mj ($2 \leq j \leq 4$) and the dichroic mirrors M(j+1) in the Z-axis direction and the steps between the dichroic mirrors Mk (7≤k≤9) and the dichroic mirrors M(k+1) in the Z-axis direction is z.

The width and the thickness of the dichroic mirrors M1 to M10 is α and β, respectively. Here, the width α is defined as the width of the dichroic mirrors M1 to M10 parallel to the XZ plane and perpendicular to the normal vectors. The thickness β, is defined as the width parallel to the normal vectors of the dichroic mirrors M1 to M10.

The incident angle of the light fluxes on the incident surfaces of the dichroic mirror M1 and the dichroic mirror M6 is $\theta_0$, and the refraction angle on the incident surface is $\theta_1$. The incident angle of the light fluxes on the incident surfaces of the dichroic mirrors M2 to M5 and the dichroic mirrors M7 to M10 is $(90°-\theta_0)$, and the refraction angle of the light flux on each incident surface is $\theta_2$.

Also in the example 8, it is possible to satisfy the condition of the best mode in which the maximum optical-path length is the shortest and the aperture width is the widest by arranging the optimum steps according to PTL 3. As in the comparative example 3, assuming α=3.4 mm, β=1.0 mm, $\theta_0$=45°, and $n_0$=1.46, $x_0$, $y_0$, $z_0$, and $V_0$ are the same as in the comparative example 3 by Expressions (27) to (30), respectively.

Here, in the example 8, the arrangement spacing of the dichroic mirrors Mj (2≤j≤4) and M(j+1) in the X-axis direction, and the arrangement spacing of the dichroic mirrors Mk (7≤k≤9) and the dichroic mirrors M(k+1) in the X-axis direction are both $x_0$=3.1 mm. The step between the dichroic mirrors M1 and M2 in the Z-axis direction and the step between the dichroic mirrors M6 and M7 in the Z-axis direction are both $y_0$=0.71 mm. The steps between the dichroic mirrors Mj and M(j+1) in the Z-axis direction and the steps between the dichroic mirrors Mk and M(k+1) in the Z-axis direction are both $z_0$=0.32 mm. The aperture width of the dichroic-mirror array for the incident light C0 is $V_0$=2.0 mm.

In this condition, the step between the dichroic mirrors M1 and M5 in the Z-axis direction is 1.7 mm, and the step between the dichroic mirrors M6 and M10 in the Z-axis direction is also 1.7 mm. That is, the maximum optical-path length is increased by 1.7 mm as compared with the case of the horizontal arrangement in which the dichroic mirrors are not shifted in the Z-axis direction.

Expressions (27) to (30) give the arrangement spacing $x_0$, the step $y_0$, the step $z_0$, and the aperture width $V_0$ in the best mode, but in reality, it is still effective even if the arrangement spacing x, the step y, the step z, and the aperture width V are deviated from the values in the best mode as described in PTL 3. Specifically, the following Expressions (35) to (37) may be satisfied.

$$\cos\theta_0 * \alpha \leq x \leq \cos\theta_0 * \alpha + 2*\sin\theta_0 * \beta \quad (35)$$

$$0 \leq y \leq 2*\cos\theta_0 * \beta \quad (36)$$

$$0 \leq z \leq 2*\sin(90-\theta_0-\theta_2)/\cos\theta_2 * \beta \quad (37)$$

As described above, in the dichroic-mirror array of the example 8, since each dichroic mirror is arranged in a stepwise manner, the aperture width can be expanded and the optical-path length can be reduced.

4. Fourth Embodiment

Figure 30:
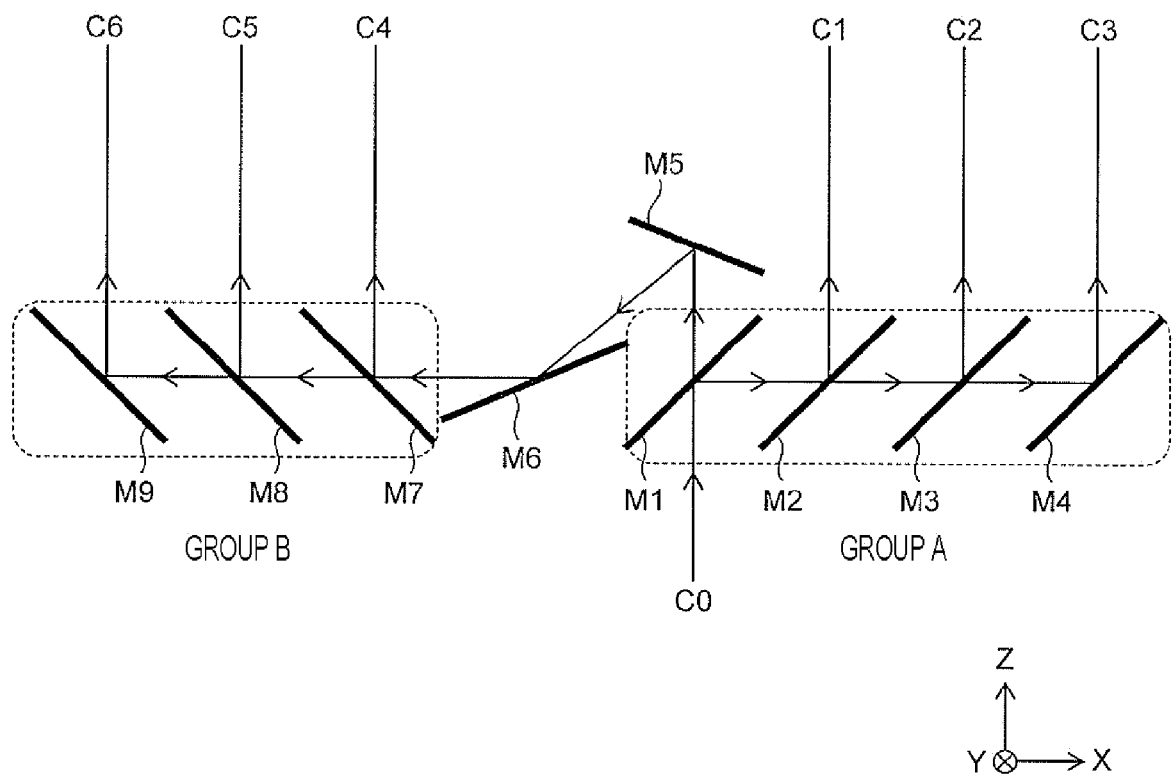
FIG. 30 is a cross-sectional view illustrating a configuration of a 6-split dichroic-mirror array according to a fourth embodiment.

FIG. 30 is a cross-sectional view illustrating a configuration of a dichroic-mirror array according to a fourth embodiment. In the dichroic-mirror arrays illustrated in the above embodiments, all the dichroic mirrors have an angle of 45° with respect to the incident light C0, but the dichroic-mirror array is not limited to this configuration.

The dichroic-mirror array according to this embodiment includes the dichroic mirrors M1 to M4 of the group A, the dichroic mirrors M7 to M9 of the group B, and the dichroic mirrors M5 and M6 arranged between the groups A and B, and splits the incident light C0 into six lights to obtain six split lights C1 to C6.

The dichroic mirrors M1 to M4 have a slope of 45° with respect to the XY plane and the YZ plane, and are arranged parallel to each other and at approximately equal intervals along the positive direction of the X axis. The dichroic mirrors M7 to M9 have a slope of 45° with respect to the XY plane and the YZ plane, and are arranged parallel to each other and along the negative direction of the X axis. The normal lines of the incident surfaces of the dichroic mirrors M1 to M4 of the group A and the normal lines of the incident surfaces of the dichroic mirrors M7 to M9 of the group B are parallel to the XZ plane and are arranged in directions orthogonal to each other. The dichroic mirror M2 (corresponding to DA2 above) and the dichroic mirror M8 (corresponding to DB2 above) have different positions in the X-axis direction. However, in this embodiment, the group A and the group B have the same position in the Z-axis direction.

The dichroic mirror M5 is arranged on the positive direction side of the Z axis from the dichroic mirror M1, but has a slope of not 45° with respect to the XY plane and the YZ plane.

The dichroic mirror M6 has the same position in the Z-axis direction as the group A and the group B, and is arranged between the dichroic mirrors M1 and M7. The dichroic mirror M6 has a slope of not 45° with respect to the XY and YZ planes.

With such a configuration, the transmitted light through the dichroic mirror M1 is incident on the dichroic mirror M5, the reflected light by the dichroic mirror M5 is incident on the dichroic mirror M6, and the reflected light by the dichroic mirror M6 is incident on the dichroic mirror M7.

As illustrated in FIG. 30, in the dichroic-mirror array of this embodiment, the split lights C1 to C3 derived from the group A and the split lights C4 to C6 derived from the group B among the six split lights C1 to C6 can be spatially separated. This makes it possible to detect the split lights of each group with different sensors. This is effective when all the split lights do not fit in one sensor.

Further, the disclosure is not limited to the above embodiments, but various modifications may be contained. For example, the above-described embodiments of the disclosure have been described in detail in a clearly understandable way, and are not necessarily limited to those having all the described configurations. Some of the configurations of a certain embodiment may be replaced with the configurations of the other embodiments, and the configurations of the other embodiments may be added to the configurations of the subject embodiment. Some of the configurations of each embodiment may be omitted, replaced with other configurations, and added to other configurations.

For example, in the above embodiments, examples of applying the dichroic-mirror array to a capillary-array DNA sequencer or an automatic biochemical analyzer has been described, but the present invention is not limited to this, and any photodetector can be used.

REFERENCE SIGNS LIST

DA1 to DAm dichroic mirror of group A
DB1 to DBn dichroic mirror of group B

M1 to M16 dichroic mirror
C0 incident light
C1 to C13 split light
P light-emission point
L condensing lens
S sensor surface
DS multicolor detector
1 laser-light source
2 laser beam
3 laser-beam-irradiation position
4 valve
5 sample-injection end
6 sample-elution end
7 cathode-side buffer solution
8 cathode
9 anode-side buffer solution
10 anode
11 pump block
12 syringe
13 power source
CA capillary
BP bandpass filter
g light-emission-point distance
h sensor distance
W spot size
LP long-pass filter

The invention claimed is:

1. A dichroic-mirror array, comprising:
in a right-handed XYZ coordinate system,
a first group of m (m≥2) dichroic mirrors DA1 to DAm which are arranged in order parallel to each other along a positive direction of an X axis; and
a second group of n (n≥2) dichroic mirrors DB1 to DBn which are arranged in order parallel to each other along a negative direction of the X axis,
wherein:
m+n≥6 is satisfied,
X coordinates of the DA2 to DAm are positive,
X coordinates of the DB2 to DBn are negative,
incident surfaces of the DA1 to DAm and incident surfaces of the DB1 to DBn are perpendicular to an XZ plane,
slopes of straight lines obtained by projecting normal lines of the incident surfaces of the DA1 to DAm onto the XZ plane are negative, and
slopes of straight lines obtained by projecting normal lines of the incident surfaces of the DB1 to DBn onto the XZ plane are positive.

2. The dichroic-mirror array according to claim 1,
wherein the DA1 and the DB1 are arranged along a positive direction of a Z axis, and
wherein a Z coordinate of the DA1 is smaller than a Z coordinate of the DB1.

3. The dichroic-mirror array according to claim 2,
wherein the normal lines of the incident surface of the DA1 to DAm are parallel to a straight line Z=−X, and
wherein the normal lines of the incident surfaces of the DB1 to DBn are parallel to a straight line Z=X.

4. The dichroic-mirror array according to claim 1,
wherein, when angles formed by the normal lines of the incident surfaces of the dichroic mirrors and a Z axis are $\theta_0$,
the DA1 to DAm have different transmission spectra at an incident angle $\theta_0$, and
the DB1 to DBn have different transmission spectra at an incident angle $\theta_0$.

5. The dichroic-mirror array according to claim 1,
wherein, when angles formed by the normal lines of the incident surfaces of the dichroic mirrors and a Z axis are $\theta_0$, and
when the DA1 to DA(m−1) and the DB1 to DB(n−1) make up a subgroup,
the dichroic mirrors of the subgroup have different transmission spectra at an incident angle $\theta_0$.

6. The dichroic-mirror array according to claim 5,
wherein, when cut-on wavelengths or cut-off wavelengths of the DA1 to DA(m−1) and the DB1 to DB(n−1) in the transmission spectra at the incident angle $\theta_0$ are $\lambda(DA1)$ to $\lambda(DA(m-1))$ and $\lambda(DB1)$ to $\lambda(DB(n-1))$ respectively,
when any one of $\lambda(DA2)$ to $\lambda(DA(m-1))$ is $\lambda(DA)$, and when any one of $\lambda(DB1)$ to $\lambda(DB(n-1))$ is $\lambda(DB)$,
$\lambda(DA)<\lambda(DA1)<\lambda(DB)$ or $\lambda(DA)>\lambda(DA1)>\lambda(DB)$ is satisfied.

7. The dichroic-mirror array according to claim 6,
wherein each of the cut-on wavelengths or the cut-off wavelengths has a transmittance of about 50%, and is a wavelength at which change in transmittance with wavelength is the steepest.

8. The dichroic-mirror array according to claim 7,
wherein $\lambda(DA2)<\lambda(DA3)<\ldots<\lambda(DA(m-1))$ or $\lambda(DA2)>\lambda(DA3)>\ldots>\lambda(DA(m-1))$ is satisfied.

9. The dichroic-mirror array according to claim 7,
wherein $\lambda(DB1)<\lambda(DB2)<\ldots<\lambda(DB(n-1))$ or $\lambda(DB1)>\lambda(DB2)>\ldots>\lambda(DB(n-1))$ is satisfied.

10. The dichroic-mirror array according to claim 2,
wherein Z coordinates of the DA1 to DAm are different from each other,
wherein Z coordinates of the DB1 to DBn are different from each other,
wherein, regarding the DA1 to DAm and the DB1 to DBn,
when angles between the normal lines of the incident surfaces and the Z axis are $\theta_0$, an average refractive index of a base material is $n_0$, and an average width of the base material is $\alpha$ and an average thickness of the base material is $\beta$ in a cross section parallel to the XZ plane, and
when an average of an arrangement spacing between DAj (2≤j≤(m−1)) and DA(j+1), and between DBk (2≤k≤(n−1)) and DB(k+1) in an X-axis direction is x, and an average of an arrangement spacing between DAj (2≤j≤(m−1)) and DA(j+1), and between DBk (2≤k≤(n−1)) and DB(k+1) in a Z-axis direction is z,
$\theta_0$, $n_0$, $\alpha$, $\beta$, x, and z satisfy a predetermined relationship so that an aperture width can be expanded or optical-path lengths can be reduced, in the dichroic-mirror array.

11. The dichroic-mirror array according to claim 10,
wherein $\cos\theta_0 * \alpha \leq x \leq 2*\cos\theta_0*\alpha + \sin\theta_0*\beta$ is satisfied.

12. The dichroic-mirror array according to claim 10,
wherein, when $\theta_2 = \sin^{-1}(1/n_0 * \sin\theta_0)$,
$0 \leq z \leq 2*\sin(\theta_0-\theta_2)/\cos\theta_2 * \beta$ is satisfied.

13. The dichroic-mirror array according to claim 2,
wherein Z coordinates of the DA1 to DAm are different from each other,
wherein Z coordinates of the DB1 to DBn are different from each other,
wherein, regarding the DA1 to DAm and the DB1 to DBn,
when angles between the normal lines of the incident surfaces and the Z axis are $\theta_0$, an average refractive index of a base material is $n_0$, and an average width of the base material is α and an average thickness of the base material is ß in a cross section parallel to the XZ plane, and when an average of an arrangement spacing between the DA1 and DA2, and between the DB1 and DB2 in an X-axis direction is x, and an average of an arrangement spacing between the DA1 and DA2, and between the DB1 and DB2 in a Z-axis direction is y, $\theta_0$, $n_0$, α, ß, x, and y satisfy a predetermined relationship so that an aperture width can be expanded or optical-path lengths can be reduced, in the dichroic-mirror array.

14. The dichroic-mirror array according to claim 13, wherein $\cos \theta_0 * \alpha \leq x \leq 2 * \cos \theta_0 * \alpha + \sin \theta_0 * ß$ is satisfied.

15. The dichroic-mirror array according to claim 13, wherein $0 \leq y \leq 2 * \cos \theta_0 * ß$ is satisfied.

16. The dichroic-mirror array according to claim 3, further comprising:
    a first filter that transmits light in a predetermined wavelength band,
    wherein an incident surface of the first filter is parallel to an XY plane,
    wherein the first filter and the DA1 are arranged along the positive direction of the Z axis, and
    wherein a Z coordinate of the first filter is smaller than the Z coordinate of the DA1.

17. The dichroic-mirror array according to claim 3, further comprising:
    a second filter that transmits light in a predetermined wavelength band,
    wherein an incident surface of the second filter is parallel to a YZ plane, and
    wherein the second filter is arranged between two adjacent dichroic mirrors of the DA1 to DAm or the DB1 to DBn.

18. The dichroic-mirror array according to claim 3, further comprising:
    a third filter that transmits light in a predetermined wavelength band,
    wherein an incident surface of the third filter is parallel to an XY plane, and
    wherein a Z coordinate of the third filter is larger than Z coordinates of the DA1 to DAm and the DB1 to DBn.

19. A photodetector, comprising:
    the dichroic-mirror array according to claim 3; and
    a sensor array having a plurality of sensor elements,
    wherein a sensor surface of the sensor array is arranged parallel to an XY plane, and
    wherein a Z coordinate of the sensor surface is larger than Z coordinates of the DA1 to DAm and the DB1 to DBn.

20. The photodetector according to claim 19,
    wherein an incident light traveling in a positive direction of the Z axis is incident on the DA1,
    wherein the incident light is split by the dichroic-mirror array into at least (m+n−1) split lights traveling in the positive direction of the Z axis, and
    wherein at least a part of the split lights is incident on the sensor surface.

21. The photodetector according to claim 19,
    wherein p (2≤p) incident lights arranged in a Y-axis direction and traveling in the positive direction of the Z axis are incident on the DA1,
    wherein each of the p incident lights is split by the dichroic-mirror array into at least (m+n−1) split lights traveling in the positive direction of the Z axis, and
    wherein at least a part of the split lights is incident on the sensor surface.

* * * * *